(12) United States Patent
Miyazaki et al.

(10) Patent No.: US 8,774,205 B2
(45) Date of Patent: Jul. 8, 2014

(54) NETWORK DEVICE AND ITS CONTROL METHOD AND COMPUTER PROGRAM PRODUCT

(75) Inventors: Masashi Miyazaki, Kawasaki (JP); Hideo Kodaka, Ebina (JP); Shinji Nozaki, Kawasaki (JP)

(73) Assignee: Alaxala Networks Corporation, Kawasaki (JP)

( * ) Notice: Subject to any disclaimer, the term of this patent is extended or adjusted under 35 U.S.C. 154(b) by 294 days.

(21) Appl. No.: 13/348,334

(22) Filed: Jan. 11, 2012

(65) Prior Publication Data

US 2012/0201254 A1      Aug. 9, 2012

(30) Foreign Application Priority Data

Jan. 14, 2011    (JP) ..................................... 2011-5758

(51) Int. Cl.
*H04W 52/02*     (2009.01)
*H04W 84/12*     (2009.01)

(52) U.S. Cl.
USPC .......................................... 370/419; 370/311

(58) Field of Classification Search
CPC . H04W 52/02; H04W 52/0216; H04W 84/12; H04L 12/5601; H04L 49/1507; H04L 49/1561
USPC .......................................... 370/311, 429, 419
See application file for complete search history.

(56) References Cited

U.S. PATENT DOCUMENTS 8,199,672 B1 *   6/2012   Nachum et al. ............... 370/254

FOREIGN PATENT DOCUMENTS

| JP | 2007-110599 A | 4/2007 |
|---|---|---|
| JP | 2010-011341   | 1/2010 |
| JP | 2011-010043 A | 1/2011 |

* cited by examiner

*Primary Examiner* — Ronald Abelson
(74) *Attorney, Agent, or Firm* — Foley & Lardner LLP

(57) ABSTRACT

A network device 200 for relaying packets includes a network interface 220, a forwarding engine 240, a state change controller 274, a device state controller 276 and a device information table 278. The state change controller 274 and the device state controller 276 cooperatively determine whether a packet receiver port that has received a sleep notification packet among a plurality of ports included in the network interface 220 has setting of link aggregation. When link aggregation is set for the packet receiver port, the state change controller 274 and the device state controller 276 keep the packet receiver port in a power ON state, while all other ports, which belong to an identical link aggregation group are to a power OFF state.

6 Claims, 23 Drawing Sheets

Fig.3

| PORT NUMBER | LINK AGGREGATION NUMBER | PORT STATE |
|---|---|---|
| 1 | 1 | UP |
| 2 | 1 | UP |
| 3 | 1 | UP |
| 4 | 1 | UP |
| 5 | — | UP |

Fig.4

| PORT STATE | PORT POWER ON/OFF | FORWARDING ENGINE | | PACKET RECEIVING ACCEPTED/ REJECTED | PACKET FORWARDING ACCEPTED/ REJECTED |
|---|---|---|---|---|---|
| | | PACKET RECEIVING FILTER (POWER ON/OFF PER PORT) | PACKET SENDING FILTER (POWER ON/OFF PER PORT) | | |
| UP | ON | ON | ON | ○ | ○ |
| SLEEP | ON | ON | OFF | ○ | × |
| DOWN | OFF | OFF | OFF | × | × |

Fig.6

| PORT NUMBER | POST-CHANGE PORT STATE |
|---|---|
| 1 | SLEEP |
| 2 | DOWN |
| 3 | DOWN |
| 4 | DOWN |

280

PORT STATE CHANGE INSTRUCTION DATA

Fig.10

| PORT NUMBER (2781) | LINK AGGREGATION NUMBER (2782) | PORT STATE (2783) |
|---|---|---|
| 1 | 1 | UP |
| 2 | 1 | UP |
| 3 | 1 | UP |
| 4 | 1 | UP |
| 5 | — | SLEEP |

Fig.11

| PORT NUMBER (2781) | LINK AGGREGATION NUMBER (2782) | PORT STATE (2783) |
|---|---|---|
| 1 | 1 | UP |
| 2 | 1 | UP |
| 3 | 1 | UP |
| 4 | 1 | UP |
| 5 | — | UP |

Fig.14

| NETWORK INTERFACE NUMBER (2784) | NETWORK INTERFACE STATE (2785) | PORT NUMBER (2781) | LINK AGGREGATION NUMBER (2782) | PORT STATE (2783) |
|---|---|---|---|---|
| 1 | POWER ON | 1 | 1 | UP |
| | | 2 | 1 | UP |
| | | 3 | 1 | UP |
| | | 4 | — | UP |
| | | 5 | — | DOWN |
| 2 | POWER ON | 1 | 1 | UP |
| | | 2 | 1 | UP |
| | | 3 | — | DOWN |
| | | 4 | — | DOWN |
| | | 5 | — | DOWN |

| NETWORK INTERFACE NUMBER | PORT NUMBER | POST-CHANGE PORT STATE |
|---|---|---|
| 1 | 1 | SLEEP |
| | 2 | DOWN |
| | 3 | DOWN |
| 2 | 1 | DOWN |
| | 2 | DOWN |

380

PORT STATE CHANGE INSTRUCTION DATA

Fig.21

| NETWORK INTERFACE NUMBER (2784) | NETWORK INTERFACE STATE (2785) | PORT NUMBER (2781) | LINK AGGREGATION NUMBER (2782) | PORT STATE (2783) |
|---|---|---|---|---|
| 1 | POWER ON | 1 | 1 | UP |
| | | 2 | 1 | UP |
| | | 3 | 1 | UP |
| | | 4 | — | SLEEP |
| | | 5 | — | DOWN |
| 2 | POWER ON | 1 | 1 | UP |
| | | 2 | 1 | UP |
| | | 3 | — | DOWN |
| | | 4 | — | DOWN |
| | | 5 | — | DOWN |

| NETWORK INTERFACE NUMBER (2784) | NETWORK INTERFACE STATE (2785) | PORT NUMBER (2781) | LINK AGGREGATION NUMBER (2782) | PORT STATE (2783) |
|---|---|---|---|---|
| 1 | POWER ON | 1 | 1 | SLEEP |
| | | 2 | 1 | DOWN |
| | | 3 | 1 | DOWN |
| | | 4 | — | SLEEP |
| | | 5 | — | DOWN |
| 2 | POWER ON | 1 | 1 | DOWN |
| | | 2 | 1 | DOWN |
| | | 3 | — | DOWN |
| | | 4 | — | DOWN |
| | | 5 | — | DOWN |

| NETWORK INTERFACE NUMBER (2784) | NETWORK INTERFACE STATE (2785) | PORT NUMBER (2781) | LINK AGGREGATION NUMBER (2782) | PORT STATE (2783) |
|---|---|---|---|---|
| 1 | POWER ON | 1 | 1 | SLEEP |
| | | 2 | 1 | DOWN |
| | | 3 | 1 | DOWN |
| | | 4 | — | SLEEP |
| | | 5 | — | DOWN |
| 2 | POWER OFF | 1 | 1 | DOWN |
| | | 2 | 1 | DOWN |
| | | 3 | — | DOWN |
| | | 4 | — | DOWN |
| | | 5 | — | DOWN |

| NETWORK INTERFACE NUMBER | POST-CHANGE NETWORK INTERFACE STATE |
|---|---|
| 2 | POWER ON |

← NETWORK INTERFACE STATE CHANGE INSTRUCTION DATA

Fig.25

| NETWORK INTERFACE NUMBER | NETWORK INTERFACE STATE | PORT NUMBER | LINK AGGREGATION NUMBER | PORT STATE |
|---|---|---|---|---|
| 1 | POWER ON | 1 | 1 | SLEEP |
| | | 2 | 1 | DOWN |
| | | 3 | 1 | DOWN |
| | | 4 | — | UP |
| | | 5 | — | DOWN |
| 2 | POWER OFF | 1 | 1 | DOWN |
| | | 2 | 1 | DOWN |
| | | 3 | — | DOWN |
| | | 4 | — | DOWN |
| | | 5 | — | DOWN |

Fig.26

| NETWORK INTERFACE NUMBER | NETWORK INTERFACE STATE | PORT NUMBER | LINK AGGREGATION NUMBER | PORT STATE |
|---|---|---|---|---|
| 1 | POWER ON | 1 | 1 | SLEEP |
| | | 2 | 1 | DOWN |
| | | 3 | 1 | DOWN |
| | | 4 | — | UP |
| | | 5 | — | DOWN |
| 2 | POWER ON | 1 | 1 | DOWN |
| | | 2 | 1 | DOWN |
| | | 3 | — | DOWN |
| | | 4 | — | DOWN |
| | | 5 | — | DOWN |

Fig.27

| NETWORK INTERFACE NUMBER | NETWORK INTERFACE STATE | PORT NUMBER | LINK AGGREGATION NUMBER | PORT STATE |
|---|---|---|---|---|
| 1 | POWER ON | 1 | 1 | UP |
| | | 2 | 1 | UP |
| | | 3 | 1 | UP |
| | | 4 | — | UP |
| | | 5 | — | DOWN |
| 2 | POWER ON | 1 | 1 | UP |
| | | 2 | 1 | UP |
| | | 3 | — | DOWN |
| | | 4 | — | DOWN |
| | | 5 | — | DOWN |

NETWORK DEVICE AND ITS CONTROL METHOD AND COMPUTER PROGRAM PRODUCT

CROSS REFERENCE TO RELATED APPLICATIONS

The present application claims the priority based on Japanese Patent Application No. 2011-5758 filed on Jan. 14, 2011, the disclosure of which is hereby incorporated by reference in its entirety.

BACKGROUND

1. Technical Field

The present invention relates to a network device for relaying packets. The network device herein means hardware included in a network where computers are interconnected, and may be, for example, a router, a switch, a hub, or a network interface card.

2. Description of the Related Art

In a network system including a plurality of network devices, the state of each network system is adequately changed from the ordinary active state to the quiescent state, in order to achieve the power saving function. Sending a packet for changing the state of the network device to the quiescent state from a first network device to a second network device enables the second network device to be changed to the quiescent state via a network.

There is known technology WOL (Wake On LAN). The WOL technology sends a WOL packet from a first network device to a second network device and thereby enables the second network device to be restored from the quiescent state to the normal active state via the network.

This known technology requires supply of electric power to the ports for receiving the WOL packet even when the network device is in the quiescent state, thus not achieving the sufficient power saving function. This problem is also found in a network having ling aggregation between network devices.

SUMMARY

Consequently, in order to address the problem described above, there is a need to ensure efficient power saving function in a network having link aggregation.

In order to achieve at least part of the foregoing, the present invention provides various aspects and embodiments described below.

According to a first aspect of the invention, there is provided a network device for relaying a packet. The network device comprises: an interface module provided to include a plurality of ports for connecting with a line and configured to send and receive a packet via the line, wherein the plurality of ports are controllable to be individually powered on and off, and a link aggregation is set for at least two ports among the plurality of ports; a forwarding module configured to analyze the packet received by the interface module, determine a forwarding destination to which the packet is to be forwarded, and forward the packet to the determined forwarding destination; and a port state controller configured to control power on-off state of each of the plurality of ports. The port state controller comprises: a first determination module configured, when a sleep notification packet for making the network device in quiescent state is received at a packet receiver port, among the plurality of ports included in the interface module, to determine whether the link aggregation is set for the packet receiver port; and a first changeover module configured, when the first determination module determines that the link aggregation is set for the packet receiver port, to keep the packet receiver port in a power ON state, while changing all ports other than the packet receiver port, which belong to an identical link aggregation group with the packet receiver port, among the plurality of ports, to a power OFF state.

When receiving a sleep notification packet for making the network device in the quiescent state at the packet receiver port, the network device according to the first aspect of the invention keeps only the packet receiver port in the ON state, while changing all the ports other than the packet receiver port, which belong to the same link aggregation group, to the OFF state. In a conventional network having link aggregation, all the other ports belonging to the same link aggregation group as that of the packet receiver port should be kept in the ON state. The network device according to the invention reduces the electric power potentially consumed by the other ports belonging to the same link aggregation group as that of the packet receiver port, thus ensuring efficient power saving function.

According to one preferred embodiment of the network device, the forwarding module may comprise: a number of receiving filters provided respectively corresponding to the plurality of ports and controllable to be individually powered on and off, wherein the receiving filters and the ports are the same in number; and a number of sending filters provided respectively corresponding to the plurality of ports and controllable to be individually powered on and off, wherein the sending filters and the ports are the same in number. According to this embodiment, the network device may further comprise a filter state controller configured, when the first determination module determines that the link aggregation is set for the packet receiver port, to keep a receiving filter corresponding to the packet receiver port in the power ON state and change a sending filter corresponding to the packet receiver port to the power ON state, while changing all other receiving filters and all other sending filters respectively corresponding to all the ports subjected to the change to the power OFF state by the first changeover module, to the power OFF state.

The network device according to this embodiment reduces the total electric power potentially consumed by the receiving filters and the sending filters included in the forwarding module, thus ensuring more efficient power saving function.

According to another preferred embodiment of the network device, the port state controller may comprise: a second determination module configured, when a WOL packet for restoring the network device from the quiescent state is received at a packet receiver port, among the plurality of ports included in the interface module, to determine whether the link aggregation is set for the packet receiver port; and a second changeover module configured, when the second determination module determines that the link aggregation is set for the packet receiver port, to change all ports including the packet receiver port and belonging to an identical link aggregation group with the packet receiver port, to the power ON state.

When receiving a WOL packet at the packet receiver port, the network device according to this embodiment changes all the ports including the packet receiver port and belonging to the same link aggregation group as that of the packet receiver port, to the power ON state. This ensures restoration from the quiescent state within a short time period.

According to still another preferred embodiment, the network device may comprise a plurality of the interface modules, wherein the identical link aggregation group is set for at least two ports belonging to a number of different interface modules.

When the link aggregation is set for at least two ports belonging to a number of different interface modules, the network device according to this embodiment reduces the electric power potentially consumed by the other ports belonging to the same link aggregation group as that of the packet receiver ports, thus ensuring the more efficient power saving function.

According to another preferred embodiment of the network device wherein the identical link aggregation group is set for at least two ports belonging to a number of different interface modules, the plurality of interface modules are controllable to be individually powered on and off. According to this embodiment, the network device may further comprise: a third determination module configured to determine whether there is any interface module where all ports are in the power OFF state, among the plurality of interface modules, after operation by the first changeover module; and a third changeover module configured, when the third determination module determines presence of any interface module where all the ports are in the power OFF state, to change the determined interface module to the power OFF state.

The network device of this embodiment can power off the interface module where all the ports are in the power OFF state, thus ensuring further more efficient power saving function.

According to a second aspect of the invention, there is provided a control method of a network device for relaying a packet. The network device comprises: an interface module provided to include a plurality of ports for connecting with a line and configured to send and receive a packet via the line, wherein the plurality of ports are controllable to be individually powered on and off, and a link aggregation is set for at least two ports among the plurality of ports; and a forwarding module configured to analyze the packet received by the interface module, determine a forwarding destination to which the packet is to be forwarded, and forward the packet to the determined forwarding destination. When a sleep notification packet for making the network device in quiescent state is received at a packet receiver port, among the plurality of ports included in the interface module, the control method determines whether the link aggregation is set for the packet receiver port. When it is determined that the link aggregation is set for the packet receiver port, the control method keeps the packet receiver port in a power ON state, while changing all ports other than the packet receiver port, which belong to an identical link aggregation group with the packet receiver port, among the plurality of ports, to a power OFF state.

According to a third aspect of the invention, there is provided a computer program product for controlling a network device for relaying a packet. The network device comprises: an interface module provided to include a plurality of ports for connecting with a line and configured to send and receive a packet via the line, wherein the plurality of ports are controllable to be individually powered on and off, and a link aggregation is set for at least two ports among the plurality of ports; and a forwarding module configured to analyze the packet received by the interface module, determine a forwarding destination to which the packet is to be forwarded, and forward the packet to the determined forwarding destination. The computer program product comprises: a first program code of, when a sleep notification packet for making the network device in quiescent state is received at a packet receiver port, among the plurality of ports included in the interface module, determining whether the link aggregation is set for the packet receiver port; a second program code of, when the determining determines that the link aggregation is set for the packet receiver port, keeping the packet receiver port in a power ON state, while changing all ports other than the packet receiver port, which belong to an identical link aggregation group with the packet receiver port, among the plurality of ports, to a power OFF state; and a computer readable medium that stores the first and second program codes.

Like the network device according to the first aspect of the invention, the control method of the network device according to the second aspect of the invention and the computer program product according to the third aspect of the invention can achieve the efficient power saving function.

The present invention may be implemented by diversity of aspects and embodiments other than the first aspect including the multiplicity of embodiments, the second aspect and the third aspect described above. The scope of the invention may include, for example, the control method of the network device including additional steps corresponding to the features incorporated in the multiplicity of embodiments of the first aspect, and the computer program product including additional program codes corresponding to the features incorporated in the multiplicity of embodiments of the first aspect. The invention may also be implemented as a network system including the network device according to any of the first aspect and its multiplicity of embodiments. The invention may further be implemented, for example, as a computer program having the respective program codes included in the computer program product according to the third aspect or as a data signal embodied in carrier wave to include such a computer program.

BRIEF DESCRIPTION OF THE DRAWINGS

FIG. 3 illustrates a device information table provided in the second network device;

FIG. 4 illustrates a port power correlation chart;

FIG. 6 illustrates one example of list data;

FIG. 10 illustrates another exemplary change of the device information table;

FIG. 11 illustrates another exemplary change of the device information table;

FIG. 14 illustrates a device information table provided in the third network device;

FIG. 16 illustrates one example of list data according to the second embodiment;

FIG. 21 illustrates one exemplary change of the device information table according to the second embodiment;

FIG. 22 illustrates another exemplary change of the device information table according to the second embodiment;

FIG. 23 illustrates another exemplary change of the device information table according to the second embodiment;

FIG. 24 illustrates one example of list data according to the second embodiment

FIG. 25 illustrates another exemplary change of the device information table according to the second embodiment;

FIG. 26 illustrates another exemplary change of the device information table according to the second embodiment; and FIG. 27 illustrates another exemplary change of the device information table according to the second embodiment.

DESCRIPTION OF THE PREFERRED EMBODIMENTS

Various embodiments of the invention are described in the following sequence, by way of example only, and with reference to the accompanying drawings.

Figure 1:
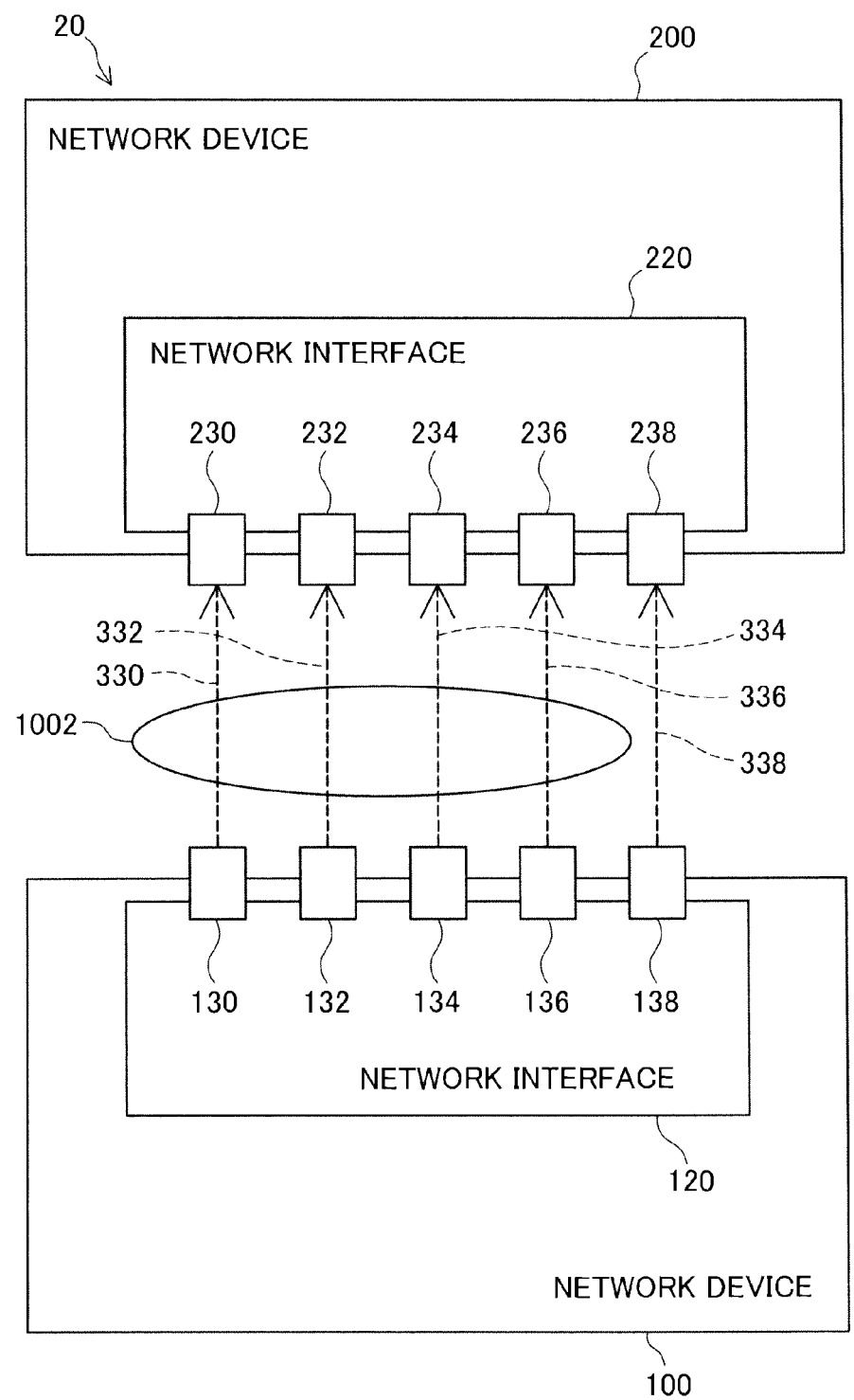
FIG. 1 illustrates the configuration of a network system according to a first embodiment of the invention.

A. First Embodiment
  A1. System Configuration
  A2. Structure of Network Device
  A3. Operations at the Time of Reception of Sleep Notification Packet
  A4. Operations at the Time of Reception of WOL Packet
  A5. Advantageous Effects of Embodiment
B. Second Embodiment
  B1. System Configuration
  B2. Structure of Network Device
  B3. Operations at the Time of Reception of Sleep Notification Packet
  B4. Operations at the Time of Reception of WOL Packet
  B5. Advantageous Effects of Embodiment
C. Modifications A. First Embodiment A1. System Configuration FIG. 1 illustrates the configuration of a network system 20 according to a first embodiment of the invention. The network system 20 includes a first network device 100 having a network interface 120 with ports 130, 132, 134, 136 and 138 and a second network device 200 having a network interface 220 with ports 230, 232, 234, 236 and 238. The first network device 100 and the second network device 200 are interconnected by means of physical lines 330, 332, 334, 336 and 338 respectively coupled to the corresponding ports 130 to 138 and 230 to 238.

Each packet to be transmitted from the first network device 100 to the second network device 200 goes out from one of the ports 130 to 138 through the coupled physical lines 330 to 338 and reaches one of the ports 230 to 238. The ports 130 to 136 and the ports 230 to 236 have the setting of link aggregation, which virtually bundles the coupled physical lines 330 to 336 as shown by an ellipse 1002. A communication network adopting Ethernet (registered trademark) standard and TCP/IP protocol is established in the network system 20.

A2. Structure of Network Device

The first network device 100 and the second network device 200 have identical structure, and the structure of the second network device 200 as the packet receiver is representatively described below.

Figure 2:
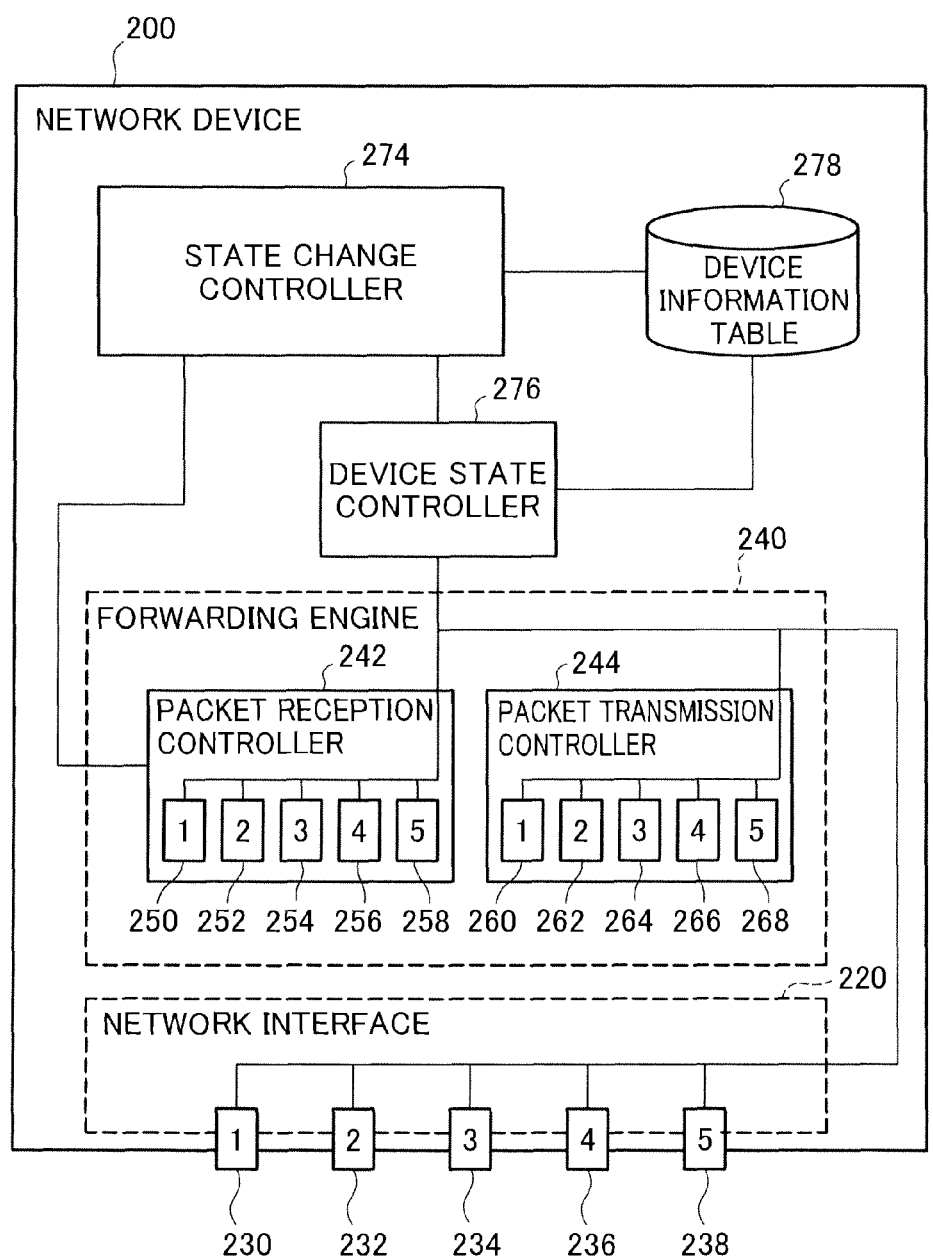
FIG. 2 illustrates the structure of a second network device included in the network system of FIG. 1.

FIG. 2 illustrates the structure of the second network device 200. The second network device 200 includes a forwarding engine 240, a state change controller 274, a device state controller 276 and a device information table 278, in addition to the network interface 220 with the ports 230 to 238.

The forwarding engine 240 analyzes a packet received at one of the ports 230 to 238 of the network interface 220, selectively determines a sender port for sending the received packet among the ports 230 to 238, and forwards the packet to the determined port. The forwarding engine 240 corresponds to the "forwarding module" described in SUMMARY. The state change controller 274 issues a command for changing the state of a predetermined region in the second network device 200, based on the packet received at the forwarding engine 240. The device state controller 276 controls the predetermined region to change its state according to the issued command. The device information table 278 stores information on the ports 230 to 238. The respective constituents 220, 240, 274, 276 and 278 of the second network device 200 are interconnected by a bus.

The network interface 220 has the ports 230 to 238, to which individual numbers starting from a number "1" are assigned. These numbers denote port numbers. The port 230 corresponds to the port number "1", the port 232 corresponds to the port number "2", the port 234 corresponds to the port number "3", the port 236 corresponds to the port number "4" and the port 238 corresponds to the port number "5". The port numbers "1" to "4" have the setting of link aggregation 1002. The ports 230 to 238 are capable of individually powering on and off the respective relevant regions. This network interface 220 corresponds to the "interface module" described in SUMMARY.

The forwarding engine 240 includes a packet reception controller 242 for controlling the packets received at the ports 230 to 238 and a packet transmission controller 244 for controlling the packets to be forwarded to the ports 230 to 238.

The packet reception controller 242 has packet receiving filters 250, 252, 254, 256 and 258 respectively corresponding to the ports 230, 232, 234, 236 and 238. As in the port numbers assigned to the ports 230 to 238, individual numbers starting from a number "1" are assigned to the packet receiving filters 250 to 258. The numbers assigned to the packet receiving filters 250 to 258 respectively correspond to the port numbers. Each of the ports 230 to 238 and each of the packet receiving filters 250 to 258 having the identical corresponding number are interconnected by a bus.

Each of the packet receiving filters 250 to 258 is configured as a circuit that detects a packet received from the ports 230 to 238, identifies whether the detected packet is a packet to be received by the second network device 200, and discards the packet identified as not the packet to be received, e.g., discarding the packet addressed to itself. When a packet received at one of the packet receiving filters 250 to 258 is addressed to the second network device 200 and is either a sleep notification packet or a WOL packet, the packet reception controller 242 attaches the port number of the packet receiver port to the received packet and forwards the packet to the state change controller 274. The packet receiving filters 250 to 258 are capable of individually powering on and off the respective relevant regions. The "sleep notification packet" herein denotes a packet showing that the network device is to be set to the sleep state. The "WOL packet" herein is an WOL-exclusive packet and denotes a packet showing that the network device is to be restored from the quiescent state.

The packet transmission controller 244 has packet sending filters 260 to 268 respectively corresponding to the ports 230 to 238. As in the port numbers assigned to the ports 230 to 238, individual numbers starting from a number "1" are assigned to the packet sending filters 260 to 268. The numbers assigned to the packet sending filters 260 to 268 respectively correspond to the port numbers. Each of the ports 230 to 238 and each of the packet sending filters 260 to 268 having the identical corresponding number are interconnected by a bus.

Each of the packet sending filters 260 to 268 is configured as a circuit that detects a packet to be forwarded to the ports 230 to 238, identifies whether the detected packet is a packet to be sent from the second network device 200, and discards the packet identified as not the packet to be sent, e.g., discarding the out-of-band packet. The packet sending filters 260 to 268 are capable of individually powering on and off the respective relevant regions.

The state change controller 274 refers to the device information table 278 and gives a port state change command with respect to the ports 230 to 238 to the device state controller 276. The device state controller 276 performs series of operations in response to the port state change command given by the state change controller 274.

FIG. 3 illustrates the device information table 278. As illustrated, the device information table 278 includes a number of entries corresponding to the number of the ports 230 to 238, wherein each entry has three items, i.e., port number 2781, link aggregation number 2782 as the group number of link aggregation, and port state 2783. A plurality of ports having an identical number set in their items of link aggregation number 2782 constitute one group of the link aggregation. The symbol "-" set in the item of link aggregation number 2782 means that the port of the corresponding port number 2781 has no setting of link aggregation. In this illustrated example, the symbol "-" shows that the port of the corresponding port number "5" has no setting of link aggregation. The item of port state 2783 denotes the port power state selected out of three different power states "up", "sleep" and "down".

FIG. 4 illustrates a port power correlation chart 170. The port power correlation chart 170 includes the details of the respective three port power states "up", "sleep" and "down". As illustrated, the port power correlation chart 170 includes entries corresponding to the three different port power states, wherein each entry has six items, i.e., port state 180, port power 182, packet receiving filter 1841 of the forwarding engine 240, packet sending filter 1842 of the forwarding engine 240, packet receiving accepted/rejected 186, and packet forwarding accepted/rejected 188.

The item of port state 180 shows one of the three port power states "up", "sleep" and "down". The item of port power 182 shows the power on/off state with respect to the ports 230 to 238. The item of packet receiving filter 1841 shows the power on/off state per port with respect to the packet receiving filters 250 to 258 corresponding to the ports 230 to 238. The item of packet sending filter 1842 shows the power on/off state per port with respect to the packet sending filters 260 to 268 corresponding to the ports 230 to 238. The item of packet receiving accepted/rejected 186 is determined depending on the power on/off states of the port power item 182 and the packet receiving filter item 1841. The item of packet forwarding accepted/rejected 188 is determined depending on the power on/off states of the port power item 182 and the packet sending filter item 1842.

The port power state "up" in the port state item 180 means that the power "ON" state in the port power item 182 and the power "ON" state in both the packet receiving filter item 1841 and the packet sending filter item 1842 of the forwarding engine 240. The port power state "up" in the port state item 180 indicates the setting of "o" that represents "accepted" in both the packet receiving accepted/rejected item 186 and the packet forwarding accepted/rejected item 188.

The port power state "sleep" in the port state item 180 means that the power "ON" state in the port power item 182, the power "ON" state in the packet receiving filter item 1841 of the forwarding engine 240 and the power "OFF" state in the packet sending filter item 1842 of the forwarding engine 240. The port power state "sleep" in the port state item 180 indicates the setting of "o" that represents "accepted" in the packet receiving accepted/rejected item 186 but the setting of "x" that represents "rejected" in the packet forwarding accepted/rejected item 188.

The port power state "down" in the port state item 180 means that the power "OFF" state in the port power item 182 and the power "OFF" state in both the packet receiving filter item 1841 and the packet sending filter item 1842 of the forwarding engine 240. The port power state "down" in the port state item 180 indicates the setting of "x" that represents "rejected" in both the packet receiving accepted/rejected item 186 and the packet forwarding accepted/rejected item 188.

In the second network device 200, the state change controller 274 and the device state controller 276 cooperatively control the power on/off of the ports 230 to 238, the packet receiving filters 250 to 258 of the packet reception controller 242 corresponding to the ports 230 to 238 and the packet sending filters 260 to 268 of the packet transmission controller 244 corresponding to the ports 230 to 238, so as to change over among the three port power states "up", "sleep" and "down" described above. The state change controller 274 and the device state controller 276 correspond to the "port state controller" described in SUMMARY.

A3. Operations at the Time of Reception of Sleep Notification Packet

The following describes series of operations of the second network device 200 when a sleep notification packet is received at one of the ports 230 to 238.

When one of the ports 230 to 238 receives a packet, the packet is transmitted to a corresponding one of the packet receiving filters 250 to 258 in the packet reception controller 242 of the forwarding engine 240 corresponding to the packet receiver port. For example, when the port 230 of the port number "1" receives a packet, the packet is transmitted to the corresponding packet receiving filter 250 of the port number "1" in the packet reception controller 242.

The corresponding one of the packet receiving filters 250 to 258 receives the transmitted packet, analyzes the received packet, identifies whether the received packet is a packet to be received by the second network device 200, and discards the packet identified as not the packet to be received. When the packet is identified as the packet to be received, on the other hand, the corresponding one of the packet receiving filters 250 to 258 checks whether the packet is addressed to the second network device 200 and checks the type of the packet. When the results of such checks show that the received packet is addressed to the second network device 200 and is either a sleep notification packet or a WOL packet, the corresponding one of the packet receiving filters 250 to 258 attaches the port number of the packet receiver port to the received packet and sends the packet to the state change controller 274.

Figure 5:
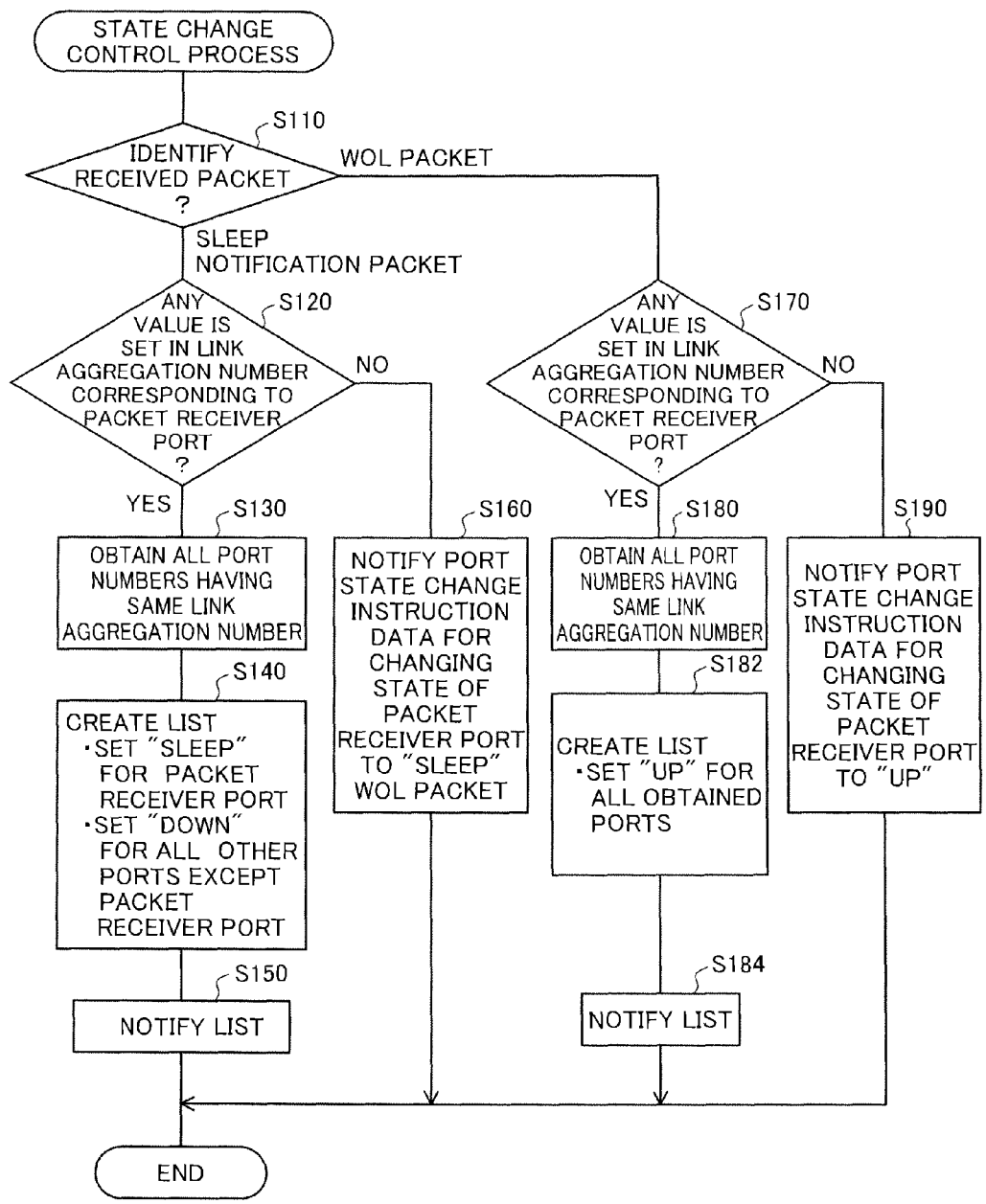
FIG. 5 is a flowchart showing a state change control process performed by a state change controller.

The state change controller 274 receiving either a sleep notification packet or a WOL packet performs a state change control process shown in FIG. 5. In other words, the state change control process of FIG. 5 is triggered when the state change controller 274 receives either a sleep notification packet or a WOL packet.

On the start of the state change control process shown in FIG. 5, the state change controller 274 first identifies whether the packet received from the packet receiving filter corresponding to the packet receiver port is a sleep notification packet or a WOL packet (step S110). When the received packet is identified as the sleep notification packet, the state change controller 274 refers to the device information table 278 and determines whether any value is set in the link aggregation number 2782 corresponding to the port number of the packet receiver port that has received the sleep notification packet (step S120).

When it is determined at step S120 that any value is set in the link aggregation number 2782, the state change controller 274 obtains all the port numbers 2781 having the same link aggregation number 2782 as that of the packet receiver port that has received the sleep notification packet, from the device information table 278 (step S130). Subsequently the state change controller 274 creates a list including the obtained port numbers 2781 having the same link aggregation number 2782 as that of the packet receiver port that has received the sleep notification packet and their changed port states (hereinafter called "post-change port state") corresponding to the respective obtained port numbers 2781 (step S140) and notifies the device state controller 276 of list data representing the created list (step S150).

More specifically, at step S140, the state change controller 274 sets the post-change port state to "sleep" for the packet receiver port that has received the sleep notification packet and to "down" for all the other ports of the port numbers obtained at step S130 except the packet receiver port set to "sleep". FIG. 6 shows one example of list data 280 created at step S140. The list data 280 of FIG. 6 is created when the device information table 278 has the contents shown in FIG. 3 and the port of the port number "1" is the packet receiver port that has received the sleep notification packet. As illustrated, the list data 280 includes one or plural data sets of the port number and the post-change port state (hereinafter called "port state change instruction data").

Referring back to FIG. 5, when it is determined at step S120 that no value is set in the link aggregation number 2782, on the other hand, the state change controller 274 notifies the device state controller 276 of the port number 2781 of the packet receiver port that has received the sleep notification packet and the post-change port state corresponding to the port number, in order to change the port state of only the packet receiver port that has received the sleep notification packet to "sleep" (step S160). More specifically, at step S160, the state change controller 274 notifies the device state controller 276 of the port state change instruction data consisting of the port number of the packet receiver port that has received the sleep notification packet and its post-change port state "sleep".

After either step S150 or step S160, the state change controller 274 terminates this state change control process. When the received packet is identified as the WOL packet at step S110, the state change controller 274 performs series of operations described later in the Section "A4. Operations at the Time of Reception of WOL Packet."

Figure 7:
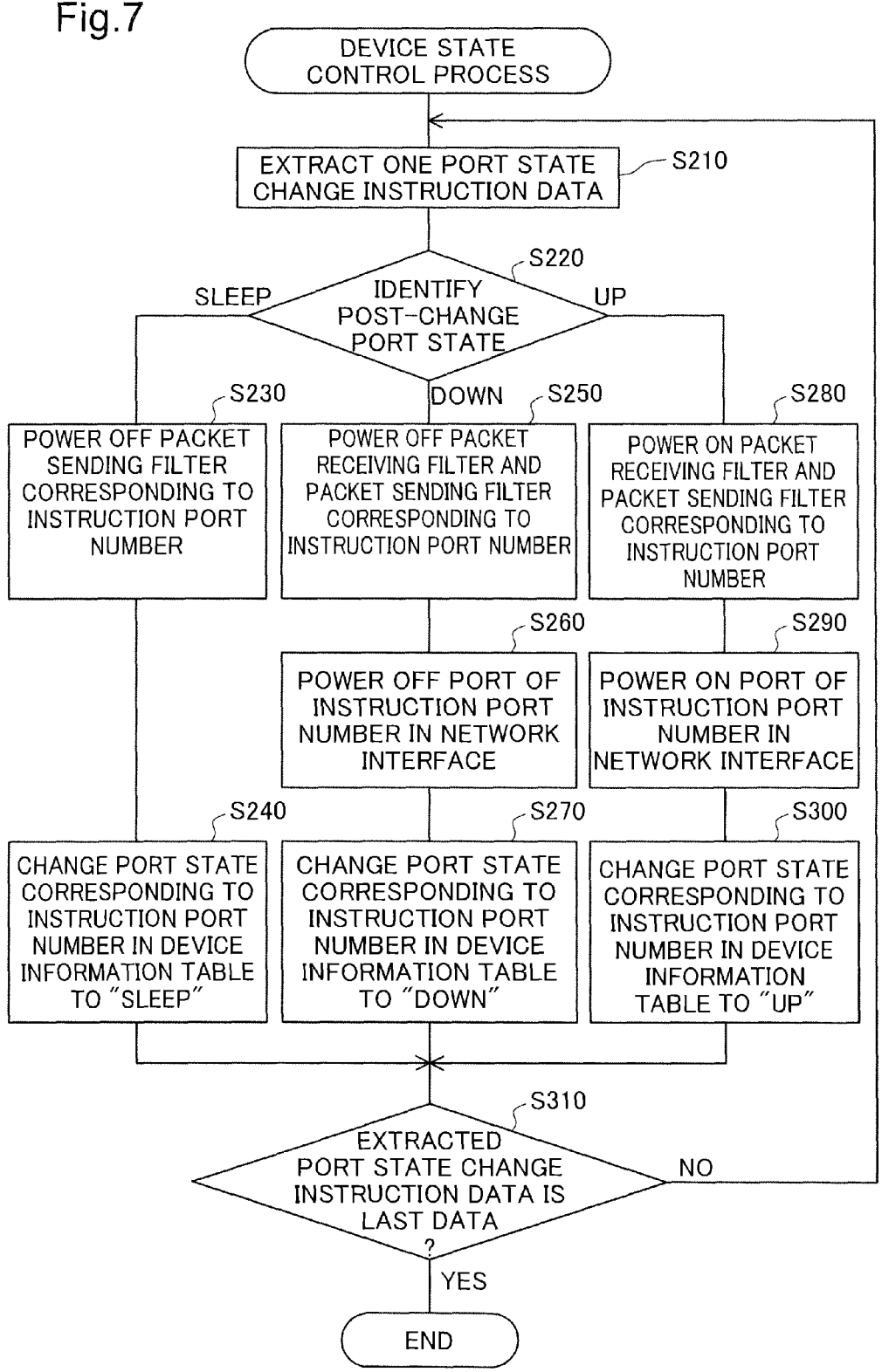
FIG. 7 is a flowchart showing a device state control process performed by a device state controller.

The device state controller 276 receives a port state change command, i.e., at the time of receiving the sleep notification packet, either the list data notified at step S150 or the port state change instruction data notified at step S160 by the state change controller 274 and performs a device state control process shown in FIG. 7. In other words, the device state control process of FIG. 7 is triggered when the device state controller 276 receives either the list data or the port state change instruction data.

On the start of the device state control process shown in FIG. 7, the device state controller 276 first extracts one port state change instruction data from the list data or the port state change instruction data notified by the state change controller 274 (step S210) and identifies the post-change port state included in the extracted port state change instruction data as "sleep", "down" or "up" (step S220).

When the post-change port state is identified as "sleep" at step S220, the device state controller 276 powers off a corresponding one of the packet sending filters 260 to 268 of the forwarding engine 240 corresponding to the port number included in the port state change instruction data extracted at step S210 (hereinafter called "instruction port number") (step S230) and changes the port state 2783 of the entry having the port number 2781 specified by the instruction port number in the device information table 278 to "sleep" (step S240).

When the post-change port state is identified as "down" at step S220, the device state controller 276 powers off a corresponding one of the packet receiving filters 250 to 258 of the forwarding engine 240 and a corresponding one of the packet sending filters 260 to 268 of the forwarding engine 240 respectively corresponding to the instruction port number (step S250), powers off the port of the instruction port number in the network interface 220 (step S260) and changes the port state 2783 of the entry having the port number 2781 specified by the instruction port number in the device information table 278 to "down" (step S270).

When the post-change port state is identified as "up" at step S220, the device state controller 276 performs series of operations described later in the Section "A4. Operations at the Time of Reception of WOL Packet."

After any of step S240, step S270 and step S300 (described later), the device state controller 276 determines whether the port state change instruction data extracted at step S210 is last data among the notified data (step S310). When it is determined at step S310 that the extracted data is not last data, the device state controller 276 returns the processing to step S210 and repeats the series of processing of steps 5210 to S310. In other words, the processing of steps S210 to S310 is repeated a number of times corresponding to the number of port state change instruction data, i.e., the number of ports subjected to the state change. When it is determined at step S310 that the extracted data is the last data, the device state controller 276 terminates this device state control process.

The operations at the time of reception of the sleep notification packet will be more fully understood through the following description of a concrete change in the contents of the device information table 278. When the device information table 278 has the contents of FIG. 3 and the port 230 has received the sleep notification packet, the contents of the device information table 278 are changed to the contents shown in FIG. 8. The contents of the device information table 278 are changed from the contents of FIG. 3 to the contents of FIG. 8 by series of operations described below.

After receiving a packet, the state change controller 274 identifies the received packet as the sleep notification packet at step S110 (FIG. 5) and determines that any value is set in the link aggregation number corresponding to the packet receiver port 230 at step S120 (FIG. 5). The state change controller 274 then creates a list including all the port numbers "1" to "4" of the same link aggregation number and the new port states of these port numbers and notifies the device state controller 276 of list data representing the created list, in order to change the port state of the port number "1" corresponding to the packet receiver port 230 to "sleep", while changing the port states of the other port numbers "2", "3" and "4" to "down", at steps S130 to S150 (FIG. 5).

The device state controller 276 checks the post-change port state included in each notified port state change instruction data at steps S210 and S220 (FIG. 7) and performs the processing of steps S230 to S240 (FIG. 7) with respect to the port number "1" as the instruction port number, while performing the processing of steps S250 to S270 (FIG. 7) with respect to the port numbers "2", "3" and "4". As the results of such processing, as shown in the device information table 278 of FIG. 8, the port state of the port 230 having the port number "1" is changed to "sleep", while the port states of all the other ports but the port 230 belonging to the same link aggregation group as the port 230 (i.e., the ports 232, 234 and 236 having the port numbers "2", "3" and "4") are changed to "down". There is no change in port state with respect to the port 238 having the port number "5".

Figure 8:
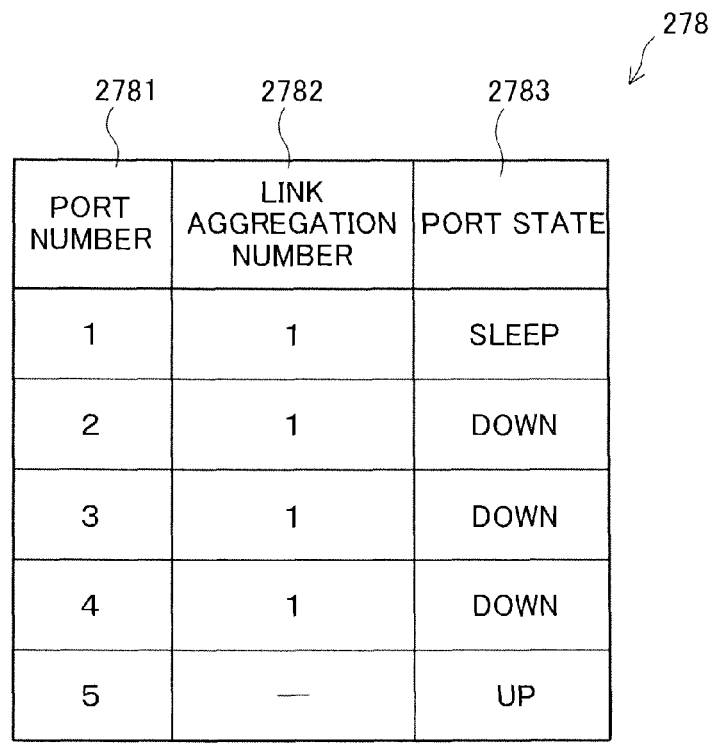
FIG. 8 illustrates one exemplary change of the device information table.
Figure 9:
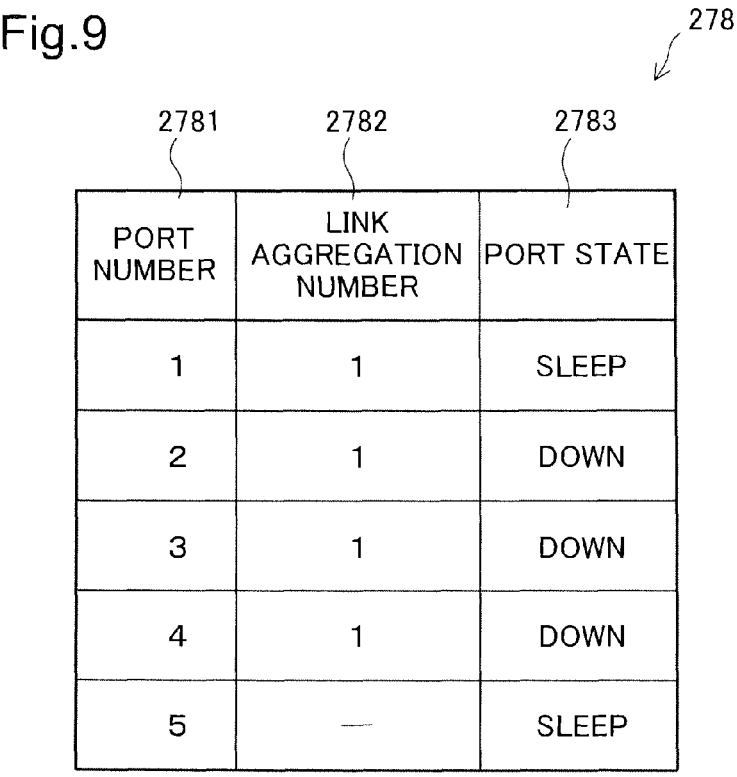
FIG. 9 illustrates another exemplary change of the device information table.

When the device information table 278 has the contents shown in FIG. 8 and the port 238 has received the sleep notification packet, the contents of the device information table 278 are changed to the contents shown in FIG. 9. The contents of the device information table 278 are changed from the contents of FIG. 8 to the contents of FIG. 9 by series of operations described below.

After receiving a packet, the state change controller 274 identifies the received packet as the sleep notification packet at step S110 (FIG. 5) and determines that no value is set in the link aggregation number corresponding to the packet receiver port 238 at step S120 (FIG. 5). The state change controller 274 then notifies the device state controller 276 of the port state change instruction data consisting of the port number and the post-change port state of "sleep", in order to change the port state of the packet receiver port 238 having the port number "5" to "sleep" at step S160 (FIG. 5).

The device state controller 276 checks the post-change port state included in the notified port state change instruction data at steps S210 and S220 (FIG. 7) and performs the processing of steps S230 to S240 (FIG. 7) with respect to the port number "5" as the instruction port number. As the results of such processing, as shown in the device information table 278 of FIG. 9, the port state of the port 238 having the port number "5" is changed to "sleep", while there is no change in port state with respect to the other ports.

The processing of step S120 in the state change control process of FIG. 5 corresponds to the "first determination module" described in SUMMARY. The processing of steps S130 to S150 in the state change control process of FIG. 5 and the processing of steps S220 to S270 in the device state control process of FIG. 7 correspond to the "first changeover module" described in SUMMARY.

A4. Operations at the Time of Reception of WOL Packet

The following describes series of operations of the second network device 200 when a WOL packet is received at one of the ports 230 to 238.

When one of the ports 230 to 238 receives a packet, the packet is transmitted to a corresponding one of the packet receiving filters 250 to 258 in the packet reception controller 242 of the forwarding engine 240 corresponding to the packet receiver port. The operations performed by the corresponding one of the packet receiving filters 250 to 258 receiving the transmitted packet have been described above. As described above, when the received packet is addressed to the second network device 200 and is a WOL packet, the corresponding one of the packet receiving filters 250 to 258 attaches the port number of the packet receiver port to the received packet and sends the packet to the state change controller 274.

The state change controller 274 then performs the state change control process shown in FIG. 5. When the received packet is identified as the WOL packet at step S110 in the state change control process, the state change controller 274 refers to the device information table 278 and determines whether any value is set in the link aggregation number 2782 corresponding to the port number of the packet receiver port that has received the WOL packet (step S170).

When it is determined at step S170 that any value is set in the link aggregation number 2782, the state change controller 274 obtains all the port numbers 2781 having the same link aggregation number 2782 as that of the packet receiver port that has received the WOL packet, from the device information table 278 (step S180). Subsequently the state change controller 274 creates a list including the obtained port numbers 2781 having the same link aggregation number 2782 as that of the packet receiver port that has received the WOL packet and their post-change port states corresponding to the respective obtained port numbers 2781 (step S182) and notifies the device state controller 276 of list data representing the created list (step S184).

More specifically, at step S180, the state change controller 274 sets the post-change port state to "up" with respect to all the obtained port numbers. The list data accordingly includes one or plural port state change instruction data, each consisting of the port number and the post-change port state "up".

When it is determined at step S170 that no value is set in the link aggregation number 2782, on the other hand, the state change controller 274 notifies the device state controller 276 of the port number 2781 of the packet receiver port that has received the WOL packet and the post-change port state corresponding to the port number, in order to change the port state of only the packet receiver port that has received the WOL packet to "up" (step S190). More specifically, at step S190, the state change controller 274 notifies the device state controller 276 of the port state change instruction data consisting of the port number of the packet receiver port that has received the WOL packet and its post-change port state "up".

After either step S184 or step S190, the state change controller 274 terminates this state change control process.

The device state controller 276 receives the port state change command, i.e., at the time of receiving the WOL packet, either the list data notified at step S184 or the port state change instruction data notified at step S190 by the state change controller 274, and performs the device state control process shown in FIG. 7. The post-change port state included in the extracted port state change instruction data is identified as "up" at step S220 of the device state control process, so that the device state controller 276 proceeds to step S280.

The device state controller 276 powers on a corresponding one of the packet receiving filters 250 to 258 of the forwarding engine 240 and a corresponding one of the packet sending filters 260 to 268 of the forwarding engine 240 respectively corresponding to the instruction port number (step S280), powers on the port of the instruction port number in the network interface 220 (step S290) and changes the port state 2783 of the entry having the port number 2781 specified by the instruction port number in the device information table 278 to "up" (step S300). After step S300, the device state controller 276 proceeds to step S310 explained above.

The operations at the time of reception of the WOL packet will be more fully understood through the following description of a concrete change in the contents of the device information table 278. When the device information table 278 has the contents of FIG. 9 and the port 230 has received the WOL packet, the contents of the device information table 278 are changed to the contents shown in FIG. 10. The contents of the device information table 278 are changed from the contents of FIG. 9 to the contents of FIG. 10 by series of operations described below.

After receiving a packet, the state change controller 274 identifies the received packet as the WOL packet at step S110 (FIG. 5) and determines that any value is set in the link aggregation number corresponding to the packet receiver port 230 at step S170 (FIG. 5). The state change controller 274 then creates a list including all the port numbers "1" to "4" of the same link aggregation number and the new port states of these port numbers and notifies the device state controller 276 of list data representing the created list, in order to change the port states of all the obtained port numbers "1", "2", "3" an "4" to "up" at steps S180 to S184 (FIG. 5).

The device state controller 276 checks the post-change port state included in each notified port state change instruction data at steps S210 and S220 (FIG. 7) and performs the processing of steps S280 to S300 (FIG. 7) with respect to the port number "1" as the instruction port number and the port numbers "2", "3" and "4". As the results of such processing, as shown in the device information table 278 of FIG. 10, the port states of all the port 230 having the port number "1" and the other ports but the port 230 belonging to the same link aggregation group as the port 230 (i.e., the ports 232, 234 and 236 having the port numbers "2", "3" and "4") are changed to "up". There is no change in port state with respect to the port 238 having the port number "5".

When the device information table 278 has the contents shown in FIG. 10 and the port 238 has received the WOL packet, the contents of the device information table 278 are changed to the contents shown in FIG. 11. The contents of the device information table 278 are changed from the contents of FIG. 10 to the contents of FIG. 11 by series of operations described below.

After receiving a packet, the state change controller 274 identifies the received packet as the WOL packet at step S110 (FIG. 5) and determines that no value is set in the link aggregation number corresponding to the packet receiver port 238 at step S170 (FIG. 5). The state change controller 274 then notifies the device state controller 276 of the port state change instruction data consisting of the port number and the post-change port state, in order to change the port state of the packet receiver port 238 having the port number "5" to "up" at step S190 (FIG. 5).

The device state controller 276 checks the post-change port state included in the notified port state change instruction data at steps S210 and S220 (FIG. 7) and performs the processing of steps S280 to S300 (FIG. 7) with respect to the port number "5" as the instruction port number. As the results of such processing, as shown in the device information table 278 of FIG. 11, the port state of the port 238 having the port number "5" is changed to "up", while there is no change in port state with respect to the other ports.

A5. Advantageous Effects of Embodiment

In the network system 20 according to the first embodiment described above, when receiving a sleep notification packet from another network device, the second network device 200 can keep only the packet receiver port in the ON state, while setting the other ports belonging to the same link aggregation group as that of the packet receiver port to the OFF state. This system according to the invention advantageously reduces the electric power potentially consumed by the other ports belonging to the same link aggregation group as that of the packet receiver port, compared with the prior art system. The second network device 200 can thus achieve the efficient power saving function.

The second network device 200 advantageously reduces the electric power potentially consumed by the packet receiving filters and the packet sending filters corresponding to the ports other than the packet receiver port, which belong to the same link aggregation group as that of the packet receiver port, among the packet receiving filters 250 to 258 and the packet sending filters 260 to 268 of the forwarding engine 240. The second network device 200 can thus achieve the more efficient power saving function.

When receiving a WOL packet, the second network device 200 changes the port states of all the ports including the packet receiver port and belonging to the same link aggregation group as that of the packet receiver port, to the port state "up". This ensures restoration from the quiescent state within a short time period.

B. Second Embodiment

B1. System Configuration

Figure 12:
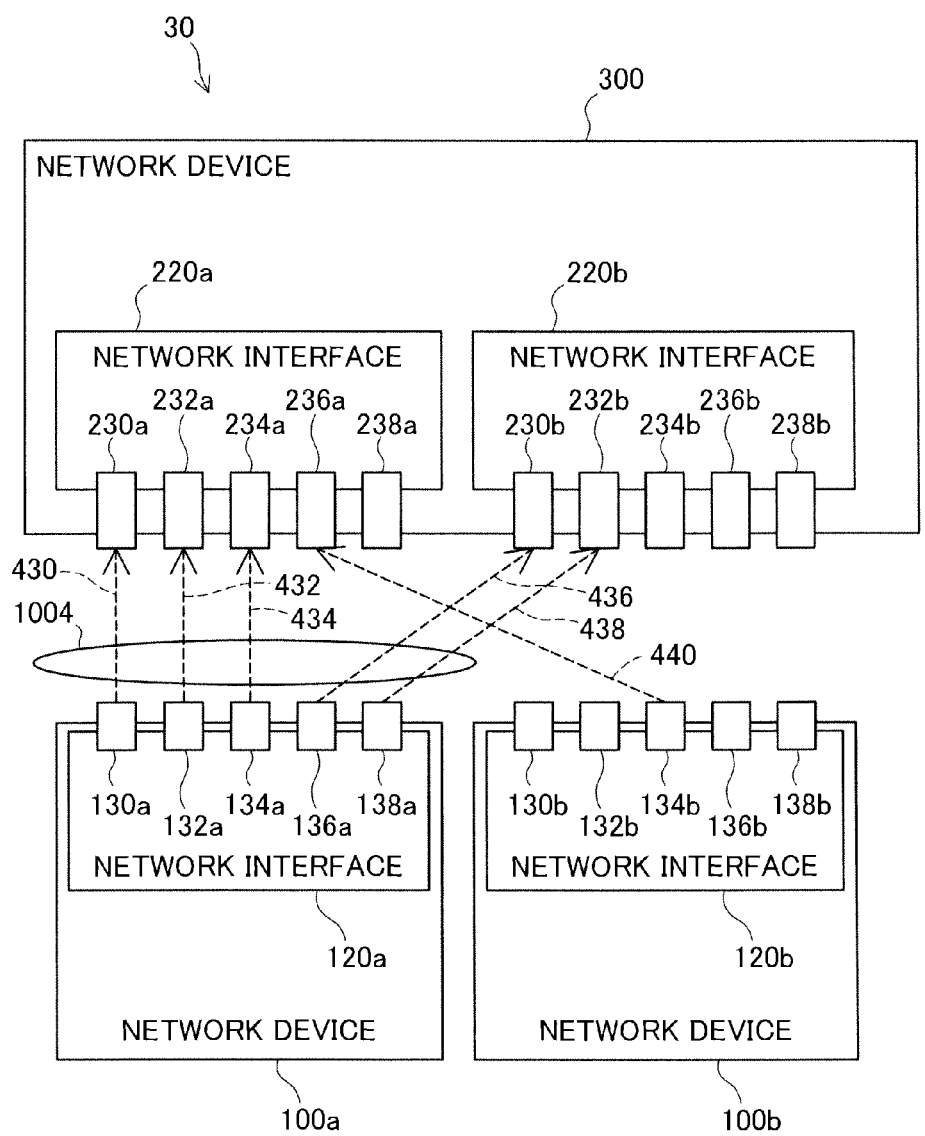
FIG. 12 illustrates the configuration of another network system according to a second embodiment of the invention.

FIG. 12 illustrates the configuration of a network system 30 according to a second embodiment of the invention. The network system 30 includes a first network device 100a, a second network device 100b and a third network device 300. The first network device 100a has a network interface 120a with ports 130a, 132a, 134a, 136a and 138a. The second network device 100b has a network interface 120b with ports 130b, 132b, 134b, 136b and 138b. The third network device 300 has a first network interface 220a with ports 230a, 232a, 234a, 236a and 238a, and a second network interface 220b with ports 230b, 232b, 234b, 236b and 238b.

The first network device 100a and the second network device 100b are connected with the third network device 300 by means of physical lines 430, 432, 434, 436, 438 and 440 respectively coupled to the ports 130a and 230a, the ports 132a and 232a, the ports 134a and 234a, the ports 136a and 230b, the ports 138a and 232b, and the ports 134b and 236a. The ports 130a to 138a, the ports 230a to 234a and the ports 230b to 232b have the setting of link aggregation, which virtually bundles the coupled physical lines 430 to 438 as shown by an ellipse 1004.

Each packet to be transmitted from the first network device 100a or the second network device 100b to the third network device 300 goes out from one of the ports 130a to 138a and the port 134b through the coupled physical lines 430 to 440 and reaches one of the ports 230a to 236a and the ports 230b to 232b. Like the first embodiment, a communication network adopting Ethernet (registered trademark) standard and TCP/IP protocol is established in the network system 30. The primary difference between the second embodiment and the first embodiment is thus that the third network device 300 as the packet destination includes the plurality of network interfaces 220a and 220b, while the plurality of network devices 100a and 100b serve as the packet sender.

B2. Structure of Network Device

Figure 13:
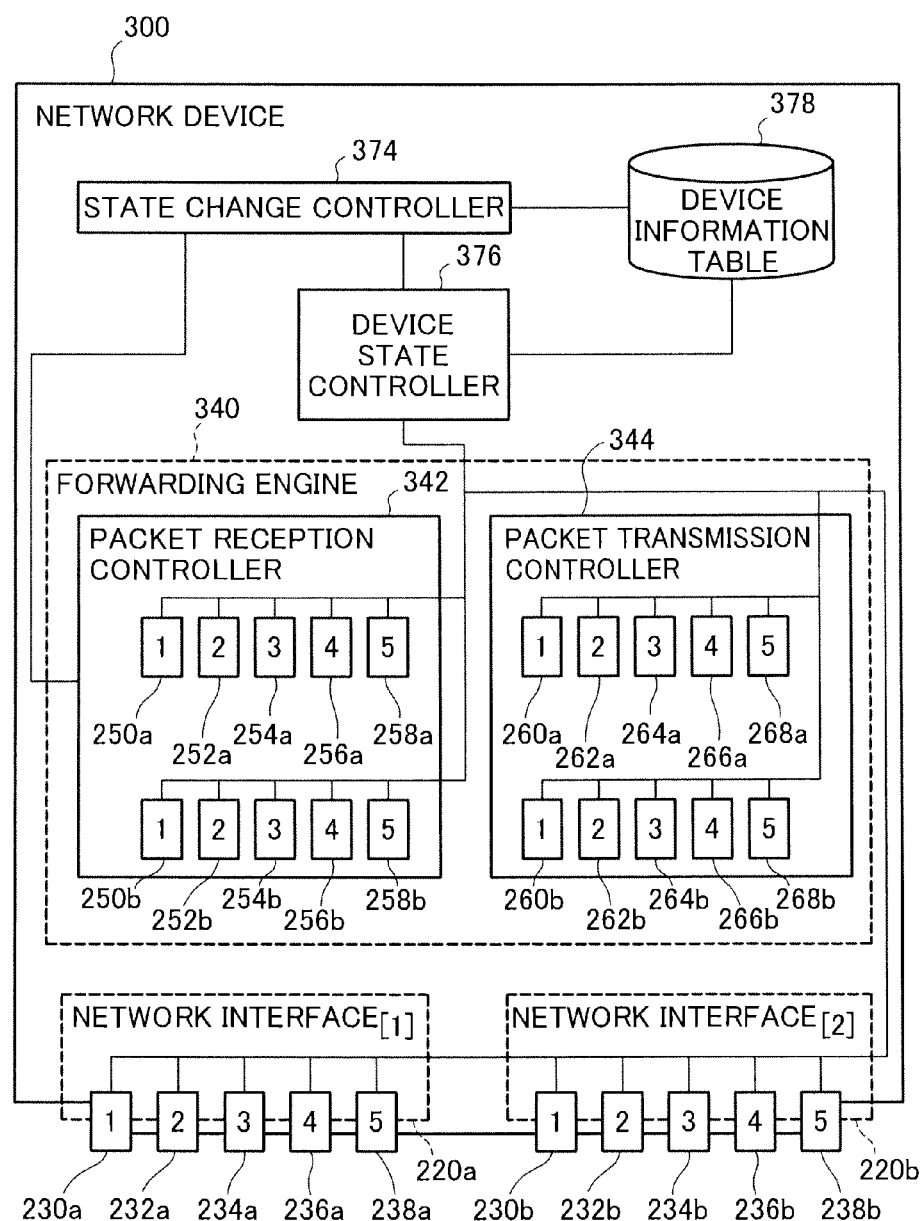
FIG. 13 illustrates the structure of a third network device included in the network system of FIG. 12.

FIG. 13 illustrates the structure of the third network device 300. The third network device 300 includes a forwarding engine 340, a state change controller 374, a device state controller 376 and a device information table 378 like the first embodiment, in addition to the first network interface 220a with the ports 230a to 238a and the second network interface 220b with the ports 230b to 238b. Individual numbers starting from a number "1" are assigned to the plurality of network interfaces 220a and 220b included in the third network device 300. These numbers denote network interface numbers. In the illustrated embodiment including two network interfaces, a network interface number "1" is assigned to the first network interface 220a, and a network interface number "2" is assigned to the second network interface 220b.

The first network interface 220a has the ports 230a to 238a, and the second network interface 220b has the ports 230b to 238b. Individual numbers starting from a number "1" are assigned separately to the ports 230a to 238a and to the ports 230b to 238b. These numbers denote port numbers. The port 230a and the port 230b correspond to the port number "1", the port 232a and the port 232b correspond to the port number "2", the port 234a and the port 234b correspond to the port number "3", the port 236a and the port 236b correspond to the port number "4" and the port 238a and the port 238b correspond to the port number "5". The individual ports 230a to 238a and 230b to 238b included in the network interfaces 220a and 220b are identifiable by the combinations of the network interface number and the port number.

The port numbers "1" to "3" of the network interface number "1" and the port numbers "1" and "2" of the network interface number "2" have the setting of link aggregation 1004. The first network interface 220a and the second network interface 220b are capable of individually powering on and off the respective relevant regions. Similarly, the ports 230a to 238a and the ports 230b to 238b are capable of individually powering on and off the respective relevant regions.

The forwarding engine 340 includes a packet reception controller 342 for controlling the packets received at the ports 230a to 238a and the ports 230b to 238b and a packet transmission controller 344 for controlling the packets to be forwarded to the ports 230a to 238a and the ports 230b a to 238b.

The packet reception controller 342 has packet receiving filters 250a to 258a respectively corresponding to the ports 230a to 238a and packet receiving filters 250b to 258b respectively corresponding to the ports 230b to 238b. As in the port numbers assigned to the ports 230a to 238a and the port numbers assigned to the ports 230b to 238b, individual numbers starting from a number "1" are assigned separately to the packet receiving filters 250a to 258a and to the packet receiving filters 250b to 258b. The numbers assigned to the packet receiving filters 250a to 258a and the numbers assigned to the packet receiving filters 250b to 258b correspond to the port numbers. The network interface number "1" is assigned to the set of the packet receiving filters 250a to 258a, and the network interface number "2" is assigned to the set of the packet receiving filters 250b to 258b. Each of the ports 230a to 238a and the ports 230b to 238b and each of the packet receiving filters 250a to 258a and the packet receiving filters 250b to 258b having the identical corresponding number combination are interconnected by a bus.

Each of the packet receiving filters 250a to 258a and the packet receiving filters 250b to 258b is configured as a circuit that detects a packet received from the ports 230a to 238a and the ports 230b to 238b, identifies whether the detected packet is a packet to be received by the third network device 300, and discards the packet identified as not the packet to be received, e.g., discarding the packet addressed to itself. When a packet received at one of the packet receiving filters 250a to 258a and the packet receiving filters 250b to 258b is addressed to the third network device 300 and is either a sleep notification packet or a WOL packet, the packet reception controller 342 attaches the network interface number and the port number of the packet receiver port to the received packet and forwards the packet to the state change controller 374. The packet receiving filters 250a to 258a and the packet receiving filters 250b to 258b are capable of individually powering on and off the respective relevant regions.

The packet transmission controller 344 has packet sending filters 260a to 268a respectively corresponding to the ports 230a to 238a and packet sending filters 260b to 268b respectively corresponding to the ports 230b to 238b. As in the port numbers assigned to the ports 230a to 238a and the port numbers assigned to the ports 230b to 238b, individual numbers starting from a number "1" are assigned separately to the packet sending filters 260a to 268a and to the packet sending filters 260b to 268b. The numbers assigned to the packet sending filters 260a to 268a and the numbers assigned to the packet sending filters 260b to 268b correspond to the port numbers. The network interface number "1" is assigned to the set of the packet sending filters 260a to 268a, and the network interface number "2" is assigned to the set of the packet sending filters 260b to 268b. Each of the ports 230a to 238a and the ports 230b to 238b and each of the packet sending filters 260a to 268a and the packet sending filters 260b to 268b having the identical corresponding number combination are interconnected by a bus.

Each of the packet sending filters 260a to 268a and the packet sending filters 260b to 268b is configured as a circuit that detects a packet to be forwarded to the ports 230a to 238a and the ports 230b to 238b, identifies whether the detected packet is a packet to be sent from the third network device 300, and discards the packet identified as not the packet to be sent, e.g., discarding the out-of-band packet. The packet sending filters 260a to 268a and the packet sending filters 260b to 268b are capable of individually powering on and off the respective relevant regions.

The state change controller 374 refers to the device information table 378 and gives a port state change command with respect to the ports 230a to 238a and the ports 240b to 238b to the device state controller 376. The device state controller 376 performs series of operations in response to the port state change command given by the state change controller 374.

FIG. 14 illustrates the device information table 378. As illustrated, the device information table 378 includes a number of entries corresponding to the number of the ports 230a to 238a and the ports 230b to 238b, wherein each entry has five items, i.e., network interface number 2784, network interface state 2785, port number 2781 as the port number of the network interface number 2784, link aggregation number 2782 as the group number of link aggregation, and port state 2783. The port number 2781, the link aggregation number 2782 and the port state 2783 are also included in the device information table 278 of the first embodiment and are thus expressed by the same numerals.

In this illustrated example, the ports identified by the combinations of the network interface number "1" and the port number "4" or the port number "5" and the ports identified by the combinations of the network interface number "2" and the port number "3", the port number "4" or the port number "5" have no setting of link aggregation. The item of network interface state 2785 denotes the network interface power state selected between two different states "power ON" and "power OFF". The item of port state 2783 denotes the port power state selected out of three different power states "up", "sleep" and "down". As long as the network interface state 2785 of a certain network interface is kept to the "power OFF" state, all the ports identified by the combinations of the network interface number 2784 of the certain network interface and the respective port numbers 2781 are not changeable to either "up" or "sleep". The three power states "up", "sleep" and "down" have the same meanings as those described in the first embodiment.

B3. Operations at the Time of Reception of Sleep Notification Packet

The following describes series of operations of the third network device 300 when a sleep notification packet is received at one of the ports 230a to 238a and the ports 230b to 238b.

When one of the ports 230a to 238a and the ports 230b to 238b receives a packet, the packet is transmitted through the operation of a corresponding one of the network interfaces 220a and 220b to a corresponding one of the packet receiving filters 250a to 258a and the packet receiving filters 250b to 258b in the packet reception controller 342 of the forwarding engine 340 corresponding to the packet receiver port. For example, when the port 230a identified by the combination of the network interface number "1" and the port number "1" receives a packet, the packet is transmitted to the corresponding packet receiving filter 250a in the packet reception controller 342.

The corresponding one of the packet receiving filters 250a to 258a and the packet receiving filters 250b to 258b receives the transmitted packet, analyzes the received packet, identifies whether the received packet is a packet to be received by the third network device 300, and discards the packet identified as not the packet to be received. When the packet is identified as the packet to be received, on the other hand, the corresponding one of the packet receiving filters 250a to 258a and the packet receiving filters 250b to 258b checks whether the packet is addressed to the third network device 300 and checks the type of the packet. When the results of such checks show that the received packet is addressed to the third network device 300 and is either a sleep notification packet or a WOL packet, the corresponding one of the packet receiving filters 250a to 258a and the packet receiving filters 250b to 258b attaches the network interface number and the port number of the packet receiver port to the received packet and sends the packet to the state change controller 374.

Figure 15:
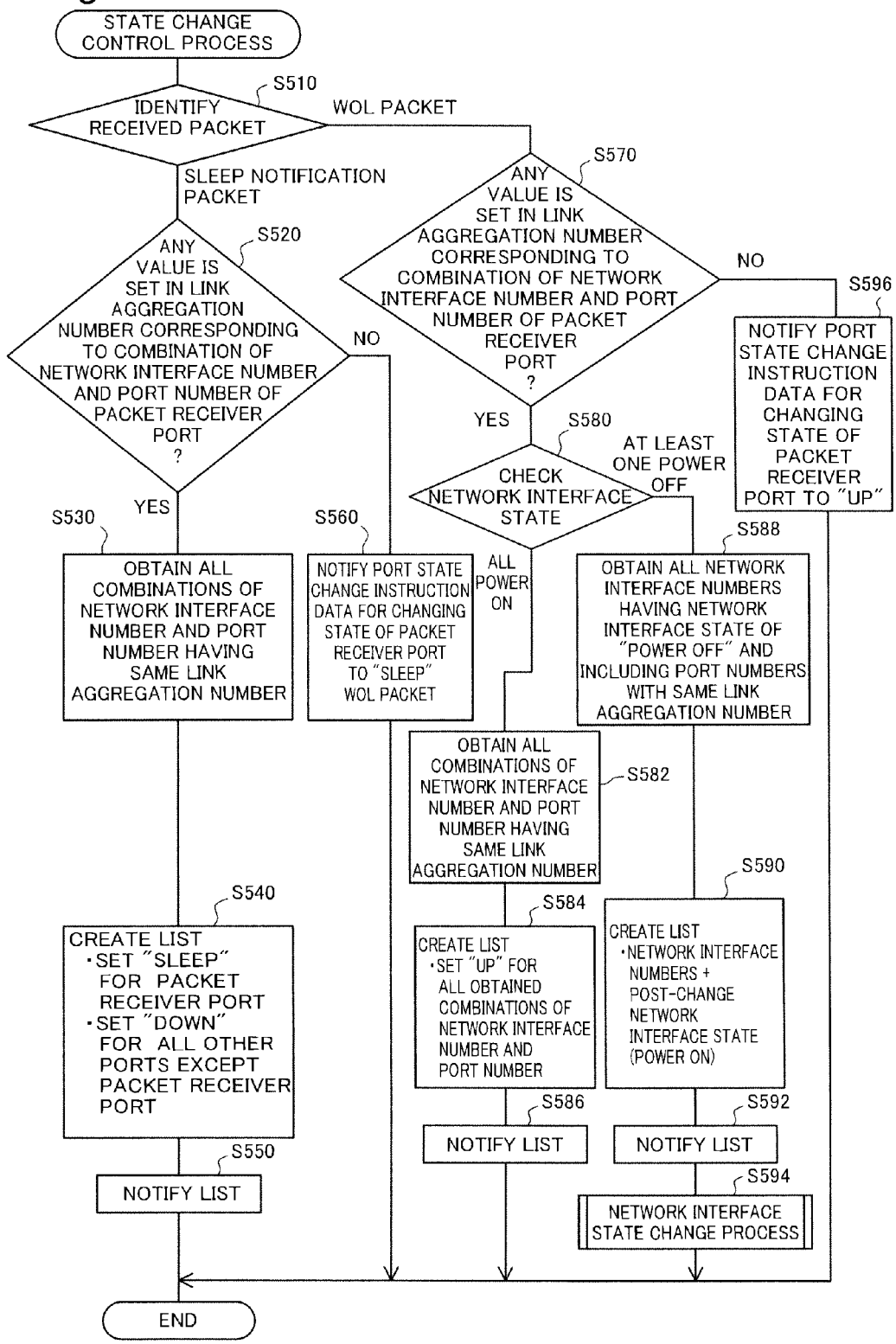
FIG. 15 is a flowchart showing a state change control process performed by a state change controller according to the second embodiment.

The state change controller 374 receiving either a sleep notification packet or a WOL packet performs a state change control process shown in FIG. 15. In other words, the state change control process of FIG. 15 is triggered when the state change controller 374 receives either a sleep notification packet or a WOL packet.

On the start of the state change control process shown in FIG. 15, the state change controller 374 first identifies whether the packet received from the packet receiving filter corresponding to the packet receiver port is a sleep notification packet or a WOL packet (step S510). When the received packet is identified as the sleep notification packet, the state change controller 374 refers to the device information table 378 and determines whether any value is set in the link aggregation number 2782 corresponding to the combination of the network interface number and the port number of the packet receiver port that has received the sleep notification packet (step S520).

When it is determined at step S520 that any value is set in the link aggregation number 2782, the state change controller 374 obtains all the combinations of the network interface number 2784 and the port number 2781 having the same link aggregation number 2782 as that of the packet receiver port that has received the sleep notification packet, from the device information table 378 (step S530). Subsequently the state change controller 374 creates a list including the obtained combinations of the network interface number 2784 and the port number 2781 having the same link aggregation number 2782 as that of the packet receiver port that has received the sleep notification packet and their changed port states (hereinafter called "post-change port state") corresponding to the respective combinations (step S540) and notifies the device state controller 376 of list data representing the created list (step S550).

More specifically, at step S540, the state change controller 374 sets the post-change port state to "sleep" for the packet receiver port that has received the sleep notification packet and to "down" for all the other ports except the packet receiver port set to "sleep" among the ports identified by the combinations of the network interface number 2784 and the port number 2781 obtained at step S530.

FIG. 16 shows one example of list data 380 created at step S540. The list data 380 of FIG. 16 is created when the device information table 378 has the contents shown in FIG. 14 and the port identified by the combination of the network interface number "1" and the port number "1" is the packet receiver port that has received the sleep notification packet. As illustrated, the list data 380 includes one or plural data sets of the combination of the network interface number and the port number and the post-change port state (hereinafter called "port state change instruction data"). Only the combination of the network interface number "1" and the port number "1" has the post-change port state of "sleep", while all the other combinations have the post-change port state of "down".

Referring back to FIG. 15, when it is determined at step S520 that no value is set in the link aggregation number 2782, on the other hand, the state change controller 374 notifies the device state controller 376 of the combination of the network interface number 2784 and the port number 2781 of the packet receiver port that has received the sleep notification packet and the post-change port state corresponding to the combination, in order to change the port state of only the packet receiver port that has received the sleep notification packet to "sleep" (step S560). More specifically, at step S560, the state change controller 374 notifies the device state controller 376 of the port state change instruction data consisting of the combination of the network interface number and the port number of the packet receiver port that has received the sleep notification packet and its post-change port state "sleep".

After either step S550 or step S560, the state change controller 374 terminates this state change control process. When the received packet is identified as the WOL packet at step S510, the state change controller 374 performs series of operations described later in the Section "B4. Operations at the Time of Reception of WOL Packet."

Figure 17:
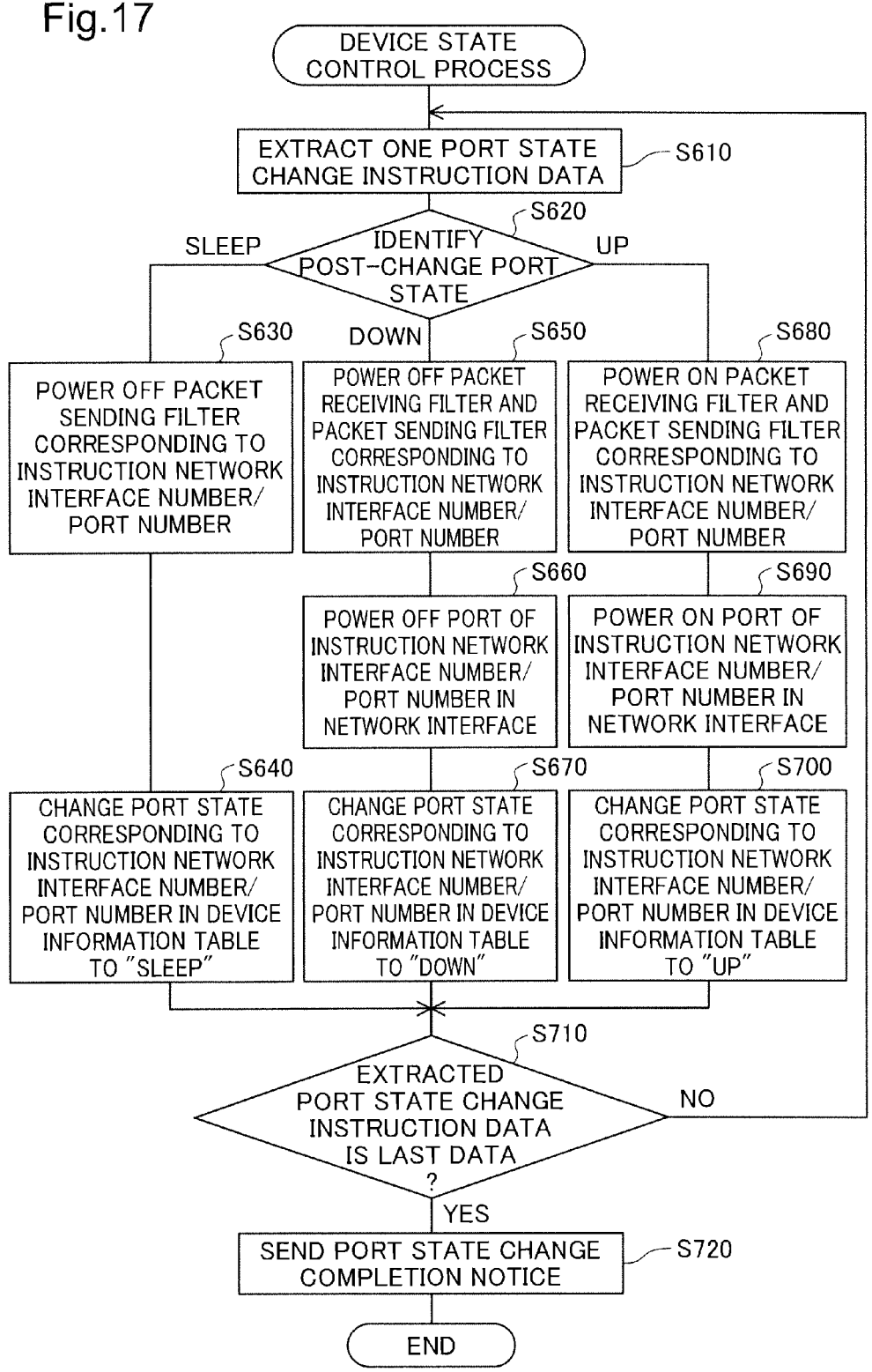
FIG. 17 is a flowchart showing a device state control process performed by a device state controller according to the second embodiment.

The device state controller 376 receives a port state change command, i.e., at the time of receiving the sleep notification packet, either the list data notified at step S550 or the port state change instruction data notified at step S560 by the state change controller 374 and performs a device state control process shown in FIG. 17. In other words, the device state control process of FIG. 17 is triggered when the device state controller 376 receives either the list data or the port state change instruction data.

On the start of the device state control process shown in FIG. 17, the device state controller 376 first extracts one port state change instruction data from the list data or the port state change instruction data notified by the state change controller 374 (step S610) and identifies the post-change port state included in the extracted port state change instruction data as "sleep", "down" or "up" (step S620).

When the post-change port state is identified as "sleep" at step S620, the device state controller 376 powers off a corresponding one of the packet sending filters 260a to 268a and the packet sending filters 260*b* to 268*b* of the forwarding engine 340 corresponding to the combination of the network interface number and the port number included in the port state change instruction data extracted at step S610 (hereinafter called "instruction network interface number/port number") (step S630) and changes the port state 2783 of the entry having the combination of the network interface number 2784 and the port number 2781 specified by the instruction network interface number/port number in the device information table 378 to "sleep" (step S640).

When the post-change port state is identified as "down" at step S620, the device state controller 376 powers off a corresponding one of the packet receiving filters 250*a* to 258*a* and 250*b* to 258*b* of the forwarding engine 340 and a corresponding one of the packet sending filters 260*a* to 268*a* and 260*b* to 268*b* of the forwarding engine 340 respectively corresponding to the instruction network interface number/port number (step S650), powers off the port specified by the instruction network interface number/port number in the network interface 220*a* or 220*b* (step S660) and changes the port state 2783 of the entry having the combination of the network interface number 2784 and the port number 2781 specified by the instruction network interface number/port number in the device information table 378 to "down" (step S670).

When the post-change port state is identified as "up" at step S620, the device state controller 376 performs series of operations described later in the Section "B4. Operations at the Time of Reception of WOL Packet."

After any of step S640, step S670 and step S700 (described later), the device state controller 376 determines whether the port state change instruction data extracted at step S610 is last data among the notified data (step S710). When it is determined at step S710 that the extracted data is not last data, the device state controller 376 returns the processing to step S610 and repeats the series of processing of steps S610 to S710. In other words, the processing of steps S610 to S710 is repeated a number of times corresponding to the number of port state change instruction data, i.e., the number of ports subjected to the state change.

When it is determined at step S710 that the extracted data is last data, on the other hand, the device state controller 376 sends a notice representing completion of port state change (hereinafter called "port state change completion notice") to the state change controller 374 (step S720). The port state change completion notice includes the lastly changed port state. After step S720, the device state controller 376 terminates the device state control process.

Figure 18:
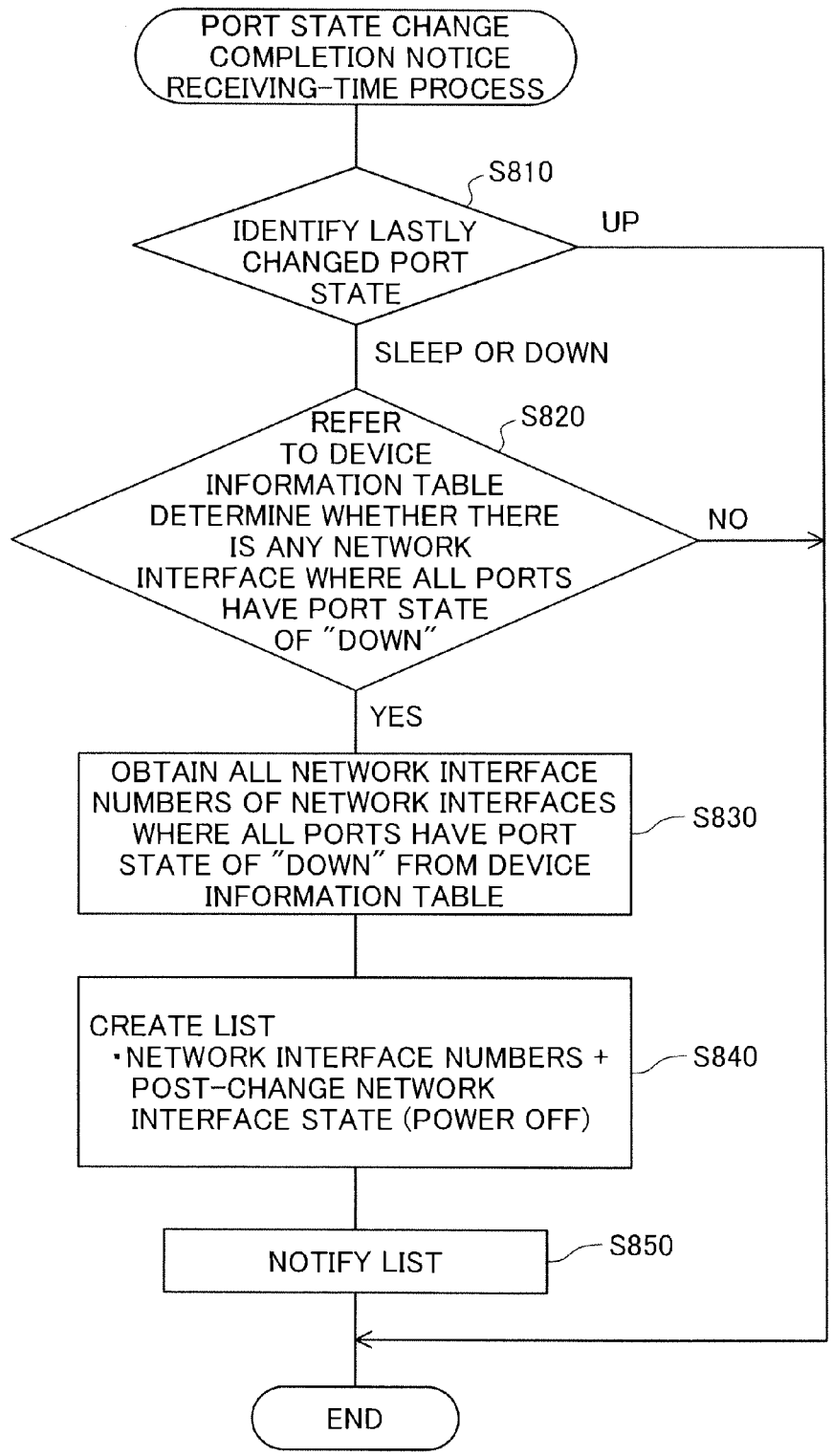
FIG. 18 is a flowchart showing a port state change completion notice receiving-time process performed by the state change controller according to the second embodiment.

When receiving the port state change completion notice from the device state controller 376, the state change controller 374 performs a port state change completion notice receiving-time process shown in FIG. 18. In other words, the port state change completion notice receiving-time process of FIG. 18 is triggered when the state change controller 374 receives the port state change completion notice.

On the start of the port state change completion notice receiving-time process shown in FIG. 18, the state change controller 374 first reads the received port state change completion notice and identifies the lastly changed port state included in the port state change completion notice as "sleep", "down" or "up" (step S810). When the lastly changed port state is identified as either "sleep" or "down" at step S810, the state change controller 374 refers to the device information table 378 and determines whether there is any network interface where all the ports have the port state 2783 of "down" (step S820). When there is any such network interface, the state change controller 374 obtains all the network interface numbers 2784 of the network interfaces where all the ports have the port state 2783 of "down", from the device information table 378 (step S830).

After step S830, the state change controller 374 creates a list including all the network interface numbers 2784 obtained at step S830 and their changed new network interface states corresponding to the obtained network interface numbers 2784 (hereinafter called "post-change network interface state") (step S840). In order to power off the network interfaces where all the ports have the port state 2783 of "down", the post-change network interface state is set to "power OFF" in the list. More specifically, at step S840, a data set consisting of the network interface number 2784 and the post-change network interface state of "power OFF" (hereinafter called "network interface state change instruction data") is obtained with respect to each of the network interfaces where all the ports have the port state 2783 of "down". The set of one or plural network interface state change instruction data forms list data. The state change controller 374 subsequently notifies the device state controller 376 of the list data (step S850). After step S850, the state change controller 374 terminates this port state change completion notice receiving-time process.

When the lastly changed port state is identified as "up" at step S810 or when there is no network interface where all the ports have the port state 2783 of "down" at step S820, the state change controller 374 terminates the port state change completion notice receiving-time process.

Figure 19:
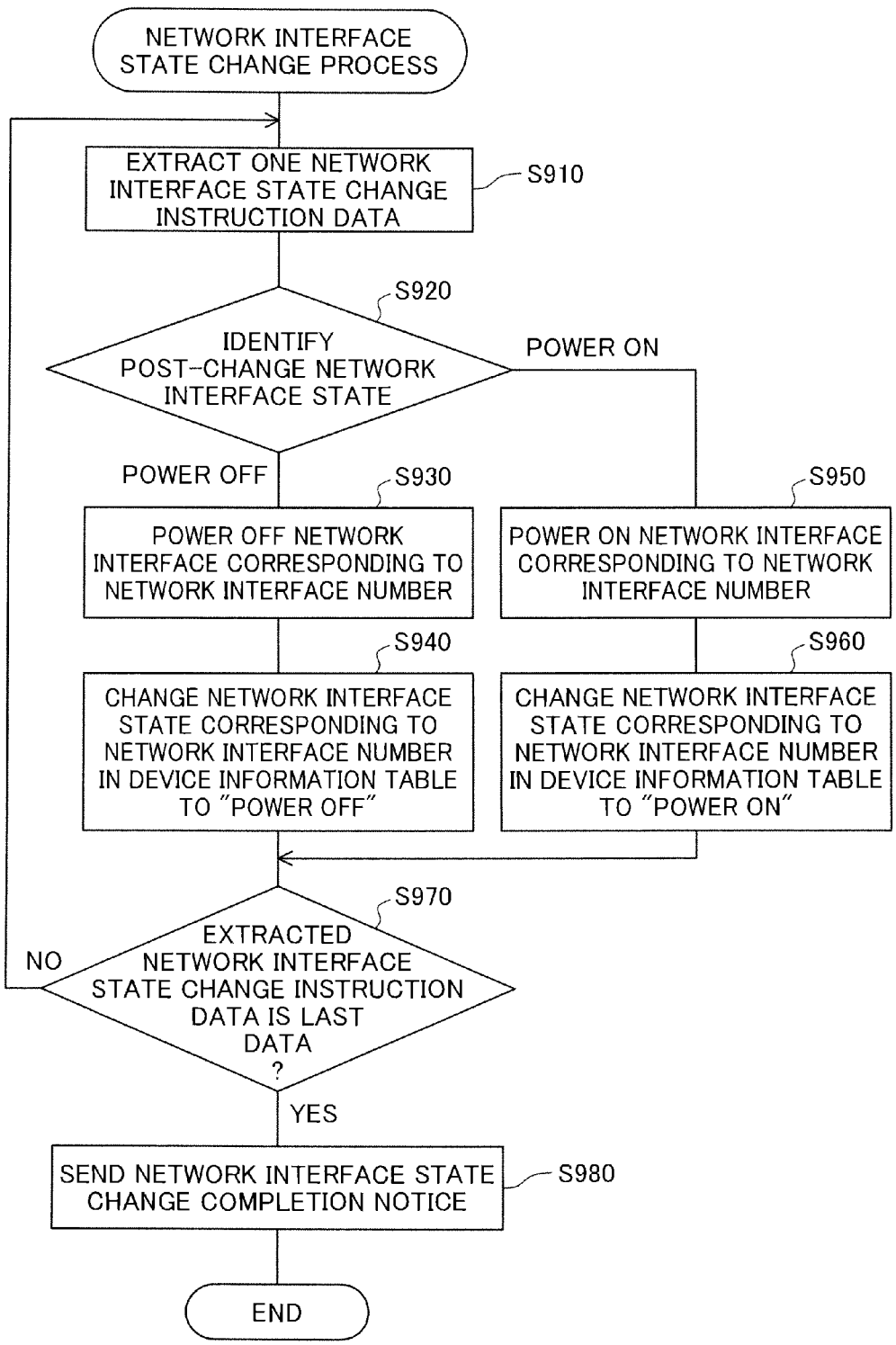
FIG. 19 is a flowchart showing a network interface state change process performed by the device state controller according to the second embodiment.

When receiving the list data notified by the state change controller 374 at step S850, the device state controller 376 performs a network interface state change process shown in FIG. 19. In other words, the network interface state change process of FIG. 19 is triggered when the device state controller 376 receives the list data.

On the start of the network interface state change process shown in FIG. 19, the device state controller 376 first extracts one network interface state change instruction data from the list data notified by the state change controller 374 (step S910) and identifies whether the post-change network interface state included in the extracted network interface state change instruction data is "power OFF" or "power ON" (step S920).

When the post-change network interface state is identified as "power OFF" at step S920, the device state controller 376 powers off the network interface corresponding to the network interface number 2784 included in the network interface state change instruction data extracted at step S910 (step S930) and changes the network interface state 2785 corresponding to the network interface number 2784 in the device information table 378 to "power OFF" (step S940).

When the post-change network interface state is identified as "power ON" at step S920, on the other hand, the device state controller 376 performs the processing of steps S950 and S960, which will be described later in the Section "B4. Operations at the Time of Reception of WOL Packet."

After either step S940 or step S960 (described later), the device state controller 376 determines whether the network interface state change instruction data extracted at step S910 is last data among the notified data (step S970). When it is determined at step S970 that the extracted data is not last data, the device state controller 376 returns the processing to step S910 and repeats the series of processing of steps S910 to S970. In other words, the processing of steps S910 to S970 is repeated a number of times corresponding to the number of network interface state change instruction data.

When it is determined at step S970 that the extracted data is last data, on the other hand, the device state controller 376 sends a notice representing completion of network interface state change (hereinafter called "network interface state change completion notice") to the state change controller 374 (step S980). The network interface state change completion notice includes the lastly changed network interface state. After step S980, the device state controller 376 terminates the network interface state change process.

Figure 20:
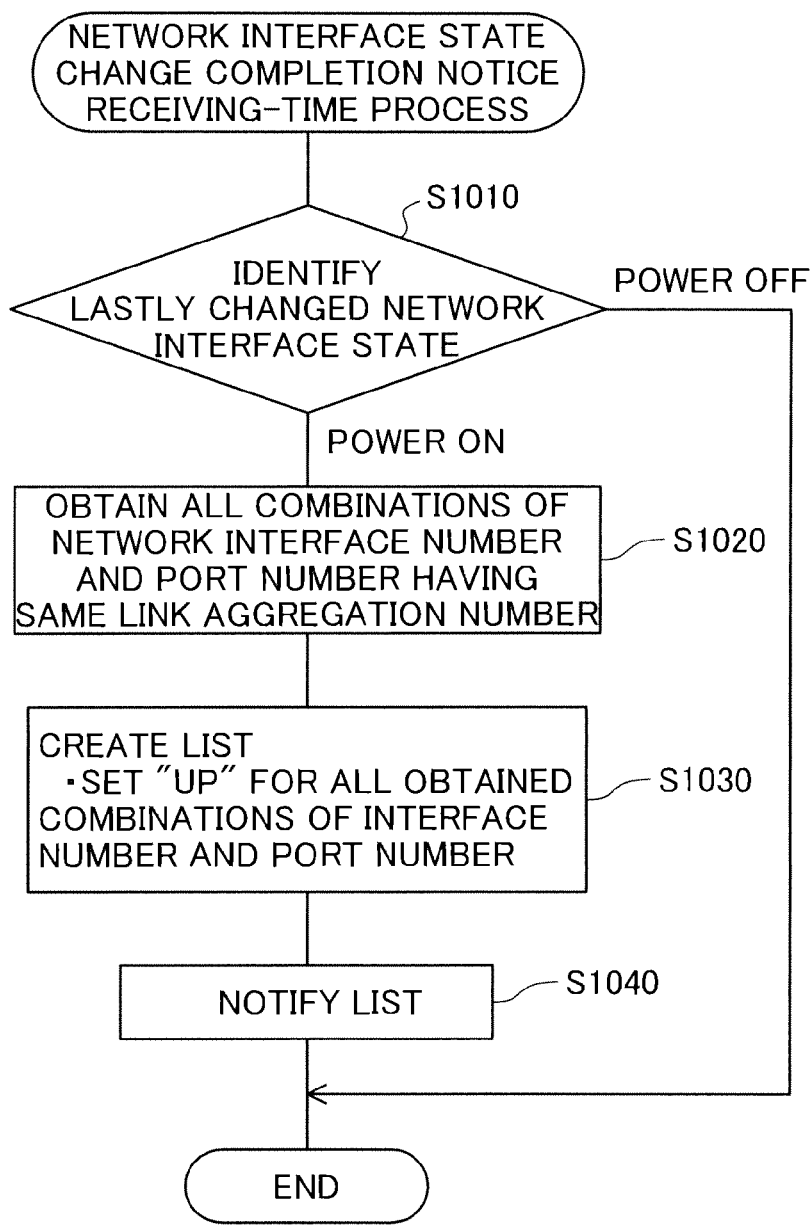
FIG. 20 is a flowchart showing a network interface state change completion notice receiving-time process performed by the state change controller according to the second embodiment.

When receiving the network interface state change completion notice from the device state controller 376, the state change controller 374 performs a network interface state change completion notice receiving-time process shown in FIG. 20. In other words, the network interface state change completion notice receiving-time process of FIG. 20 is triggered when the state change controller 374 receives the network interface state change completion notice.

On the start of the network interface state change completion notice receiving-time process shown in FIG. 20, the state change controller 374 reads the received network interface state change completion notice and identifies whether the lastly changed network interface state included in the network interface state change completion notice is "power ON" or "power OFF" (step S1010).

When the lastly changed network interface state is identified as "power OFF" at step S1010, the state change controller 374 terminates this network interface state change completion notice receiving-time process. When the lastly changed network interface state is identified as "power ON" at step S1010, on the other hand, the state change controller 374 performs the processing of steps S1020 to S1040, which will be described later in the Section "B4. Operations at the Time of Reception of WOL Packet."

The operations at the time of reception of the sleep notification packet will be more fully understood through the following description of a concrete change in the contents of the device information table 378. When the device information table 378 has the contents of FIG. 14 and the port 236*a* of the first network interface 220*a* has received the sleep notification packet, the contents of the device information table 378 are changed to the contents shown in FIG. 21. The contents of the device information table 378 are changed from the contents of FIG. 14 to the contents of FIG. 21 by series of operations described below.

After receiving a packet, the state change controller 374 identifies the received packet as the sleep notification packet at step S510 (FIG. 15) and determines that no value is set in the link aggregation number corresponding to the packet receiver port 236*a* at step S520 (FIG. 15). The state change controller 374 then notifies the device state controller 376 of the port state change instruction data consisting of the combination of the network interface number and the port number and the post-change port state of "sleep", in order to change the port state of the packet receiver port 236*a* specified by the combination of the network interface number "1" and the port number "4" to "sleep" at step S560 (FIG. 15).

The device state controller 376 checks the post-change port state included in the port state change instruction data notified by the state change controller 374 at steps S610 and S620 (FIG. 17) and performs the processing of steps S630 to S640 (FIG. 17) with respect to the combination of the network interface number "1" and the port number "4" as the instruction network interface number/port number. The device state controller 376 subsequently performs the processing of steps S710 and S720 (FIG. 17). The state change controller 374 then identifies the lastly changed port state as "sleep" at step S810 (FIG. 18), determines that there is no network interface where all the ports have the port state of "down" at step S820 (FIG. 18), and terminates the port state change completion notice receiving-time process.

As the results of such processing, as shown in the device information table 378 of FIG. 21, the port state 2783 of the port 236*a* specified by the combination of the network interface number "1" and the port number "4" is changed to "sleep", while there is no change in port state 2783 with respect to the other ports.

When the device information table 378 has the contents of FIG. 21 and the port 230*a* of the first network interface 220*a* has received the sleep notification packet, the contents of the device information table 378 are changed to the contents shown in FIG. 22. The contents of the device information table 378 are changed from the contents of FIG. 21 to the contents of FIG. 22 by series of operations described below.

After receiving a packet, the state change controller 374 identifies the received packet as the sleep notification packet at step S510 (FIG. 15) and determines that any value is set in the link aggregation number corresponding to the packet receiver port 230*a* at step S520 (FIG. 15). The state change controller 374 then creates a list including all the combinations of the network interface number and the port number having the same link aggregation number and the new port states of these combinations and notifies the device state controller 376 of list data representing the created list, in order to change the port state of the combination of the network interface number "1" and the port number "1" corresponding to the packet receiver port 230*a* to "sleep", while changing the port states of all the other combinations, i.e., the combinations of the network interface number "1" and the port number "2", the network interface number "1" and the port number "3", the network interface number "2" and the port number "1" and the network interface number "2" and the port number "2", to "down", at steps S530 to S550 (FIG. 15).

The device state controller 376 checks the post-change port state included in each of the port state change instruction data notified by the state change controller 374 at steps S610 and S620 (FIG. 17) and performs the processing of steps S630 to S640 (FIG. 17) with respect to the combination of the network interface number "1" and the port number "1", while performing the processing of steps S650 to S670 (FIG. 17) with respect to all the other combinations, i.e., the combinations of the network interface number "1" and the port number "2", the network interface number "1" and the port number "3", the network interface number "2" and the port number "1", and the network interface number "2" and the port number "2". The device state controller 376 subsequently performs the processing of steps S710 and S720 (FIG. 17).

As the results of such processing, as shown in the device information table 378 of FIG. 22, the port state 2783 of the port 230*a* specified by the combination of the network interface number "1" and the port number "1" is changed to "sleep", while the port states 2783 of all the other ports but the port 230*a* belonging to the same link aggregation group as the port 230*a* are changed to "down". There is no change in port state with respect to the ports 236*a* to 238*a* specified by the combinations of the network interface number "1" and the port number "4" or the port number "5" and the ports 234*b* to 238*b* specified by the combinations of the network interface number "2" and the port number "3", the port number "4" or the port number "5".

When the device information table 378 has the contents of FIG. 22 and the port state change has been completed, the contents of the device information table 378 are changed to the contents shown in FIG. 23. The contents of the device information table 378 are changed from the contents of FIG. 22 to the contents of FIG. 23 by series of operations described below.

The state change controller 374 identifies the lastly changed port state as "down" at step S810 (FIG. 18) and determines that there is any network interface where all the ports have the port state of "down" at step S820. In order to change the network interface state of the network interface number "2" corresponding to the second network interface 220*b* where all the ports have the port state of "down" to "power OFF", the state change controller 374 notifies the device state controller 376 of the network interface state change instruction data consisting of the network interface number "2" and the post-change network interface state of "power OFF" at steps S830 to S850 (FIG. 18).

The device state controller 376 then checks the post-change network interface state included in the network interface state change instruction data notified by the state change controller 374 at step S920 (FIG. 19) and performs the processing of steps S930, S940, S970 and S980 (FIG. 19) with respect to the network interface number "2".

As the results of such processing, as shown in the device information table 378 of FIG. 23, the network interface state of the second network interface 220*b* is changed to "power OFF".

B4. Operations at the Time of Reception of WOL Packet

The following describes series of operations of the third network device 300 when a WOL packet is received at one of the ports 230*a* to 238*a* and the ports 230*b* to 238*b*.

When one of the ports 230*a* to 238*a* and the ports 230*b* to 238*b* receives a packet, the packet is transmitted to a corresponding one of the packet receiving filters 250*a* to 258*a* and the packet receiving filters 250*b* to 258*b* in the packet reception controller 342 of the forwarding engine 340 corresponding to the packet receiver port. As described above, when the received packet is addressed to the third network device 300 and is a WOL packet, the corresponding one of the packet receiving filters 250*a* to 258*a* and the packet receiving filters 250*b* to 258*b* attaches the combination of the network interface number and the port number of the packet receiver port to the received packet and sends the packet to the state change controller 374.

The state change controller 374 then performs the state change control process shown in FIG. 15. When the received packet is identified as the WOL packet at step S510 in the state change control process, the state change controller 374 refers to the device information table 378 and determines whether any value is set in the link aggregation number 2782 corresponding to the combination of the network interface number 2784 and the port number 2781 of the packet receiver port that has received the WOL packet (step S570).

When it is determined at step S570 that any value is set in the link aggregation number 2782, the state change controller 374 refers to the device information table 378, obtains all the combinations of the network interface number 2784 and the port number 2781 having the same link aggregation number 2782 as that of the packet receiver port that has received the WOL packet, and checks each of the obtained combinations for the network interface state 2785 (step S580).

When the network interface states 2785 of all the obtained combinations are "power ON" at step S580, the state change controller 374 obtains all the combinations of the network interface number 2784 and the port number 2781 having the same link aggregation number 2782 as that of the packet receiver port that has received the WOL packet, from the device information table 378 (step S582). Subsequently the state change controller 374 creates a list including the obtained combinations of the network interface number 2784 and the port number 2781 and their post-change port states corresponding to the respective combinations (step S584) and notifies the device state controller 376 of list data representing the created list (step S586). The post-change port state is set to "up" for all the combinations in the list created at step S584. After step S586, the state change controller 374 terminates the state change control process.

When at least one of the network interface states 2785 of the obtained combinations is "power OFF" at step S580, on the other hand, the state change controller 374 obtains all the network interface numbers 2784 having the network interface state 2785 of "power OFF" and including one or a plurality of the port numbers 2781 having the same link aggregation number 2782 as that of the packet receiver port that has received the WOL packet, from the device information table 378 (step S588).

The state change controller 374 subsequently creates a list including all the network interface numbers 2784 obtained at step S588 and the post-change network interface states corresponding to the respective network interface numbers 2784 (step S590). In order to power on the network interfaces of the obtained network interface numbers 2784, the post-change network interface state is set to "power ON" in the list.

FIG. 24 shows one example of list data 382 created at step S590. More specifically, at step S590, network interface state change instruction data consisting of the network interface number 2784 and the post-change network interface state of "power ON" is obtained with respect to each of the network interface numbers obtained at step S588. The set of one or plural network interface state change instruction data forms the list data 382. The state change controller 374 subsequently notifies the device state controller 376 of the list data 382 (step S592).

After step S592, the device state controller 376 receiving the list data notified by the state change controller 374 performs the network interface state change process shown in FIG. 19 (step S594). In the network interface state change process of FIG. 19, when the post-change network interface state is identified as "power ON" at step S920, the device state controller 376 powers on the network interface corresponding to the network interface number 2784 included in the network interface state change instruction data extracted at step S910 (step S950) and changes the network interface state 2785 corresponding to the network interface number 2784 in the device information table 378 to "power ON" (step S960).

Referring back to FIG. 15, when it is determined at step S570 that no value is set in the link aggregation number 2782, on the other hand, the state change controller 374 notifies the device state controller 376 of the combination of the network interface number 2784 and the port number 2781 of the packet receiver port that has received the WOL packet and the post-change port state corresponding to the combination, in order to change the port state of only the packet receiver port that has received the WOL packet to "up" (step S596). More specifically, at step S596, the state change controller 374 notifies the device state controller 376 of the port state change instruction data consisting of the combination of the network interface number and the port number of the packet receiver port that has received the WOL packet and its post-change port state of "up". After either step S594 or step S596, the state change controller 374 terminates this state change control process.

The device state controller 376 receives the notified port state change instruction data including the post-change port state of "up" and identifies the post-change port state as "up" at step S620 in the device state control process of FIG. 17 and goes to step S680.

The device state controller 376 powers on a corresponding one of the packet receiving filters 250a to 258a and 250b to 258b of the forwarding engine 340 and a corresponding one of the packet sending filters 260a to 268a and 260b to 268b of the forwarding engine 340 respectively corresponding to the instruction network interface number/port number (step S680), powers on the port specified by the instruction network interface number/port number in the network interface 220a or 220b (step S690) and changes the port state 2783 of the entry having the combination of the network interface number 2784 and the port number 2781 specified by the instruction network interface number/port number in the device information table 378 to "up" (step S700).

In the port state change completion notice receiving-time process shown in FIG. 18, as described above, when the lastly changed port state is identified as "up" at step S810, the state change controller 374 immediately terminates the port state change completion notice receiving-time process.

In the network interface state change process of FIG. 19, as described above, when the post-change network interface state is identified as "power ON" at step S920, the device state controller 376 powers on the network interface corresponding to the network interface number 2784 included in the network interface state change instruction data extracted at step S910 (step S950) and changes the network interface state 2785 corresponding to the network interface number 2784 in the device information table 378 to "power ON" (step S960).

In the network interface state change completion notice receiving-time process shown in FIG. 20, when the lastly changed network interface state is identified as "power ON" at step S1010, the state change controller 374 proceeds to step S1020.

The state change controller 374 obtains all the combinations of the network interface number 2784 and the port number 2781 having the same link aggregation number 2782 as that of the packet receiver port that has received the WOL packet, from the device information table 378 (step S1020). Subsequently the state change controller 374 creates a list including the obtained combinations of the network interface number 2784 and the port number 2781 and their post-change port states corresponding to the respective combinations (step S1030) and notifies the device state controller 376 of list data representing the created list (step S1040). The post-change port state is set to "up" for all the combinations in the list created at step S1040. After step S1040, the state change controller 374 terminates the network interface state change completion notice receiving-time process.

The operations at the time of reception of the WOL packet will be more fully understood through the following description of a concrete change in the contents of the device information table 378. When the device information table 378 has the contents of FIG. 23 and the port 236a of the first network interface 220a has received the WOL packet, the contents of the device information table 378 are changed to the contents shown in FIG. 25. The contents of the device information table 378 are changed from the contents of FIG. 23 to the contents of FIG. 25 by series of operations described below.

After receiving a packet, the state change controller 374 identifies the received packet as the WOL packet at step S510 (FIG. 15) and determines that no value is set in the link aggregation number corresponding to the packet receiver port 236a at step S570 (FIG. 15). The state change controller 374 then notifies the device state controller 376 of the port state change instruction data consisting of the combination of the network interface number and the port number and the post-change port state of "up", in order to change the port state of the packet receiver port 236a specified by the combination of the network interface number "1" and the port number "4" to "up" at step S596 (FIG. 15).

The device state controller 376 checks the post-change port state included in the port state change instruction data notified by the state change controller 374 at steps S610 and S620 (FIG. 17) and performs the processing of steps S680 to S700 (FIG. 17) with respect to the combination of the network interface number "1" and the port number "4" as the instruction network interface number/port number. The device state controller 376 subsequently performs the processing of steps S710 and S720 (FIG. 17). The state change controller 374 then identifies the lastly changed port state as "up" at step S810 (FIG. 18) and terminates the port state change completion notice receiving-time process.

As the results of such processing, as shown in the device information table 378 of FIG. 25, the port state 2783 of the port 236a specified by the combination of the network interface number "1" and the port number "4" is changed to "up", while there is no change in port state 2783 with respect to the other ports.

When the device information table 378 has the contents of FIG. 25 and the port 230a of the first network interface 220a has received the WOL packet, the contents of the device information table 378 are changed to the contents shown in FIG. 26. The contents of the device information table 378 are changed from the contents of FIG. 25 to the contents of FIG. 26 by series of operations described below.

After receiving a packet, the state change controller 374 identifies the received packet as the WOL packet at step S510 (FIG. 15) and determines that any value is set in the link aggregation number corresponding to the packet receiver port 230a at step S570 (FIG. 15). The state change controller 374 subsequently detects the presence of the second network interface 220b in the "power OFF" state at step S580 and notifies the device state controller 376 of the network interface number "2" and the post-change network interface state, in order to change the network interface state of the network interface "2" corresponding to the second network interface 220b to "power ON" at steps S588 to S592 (FIG. 15).

The device state controller 376 identifies the post-change network interface state notified by the state change controller 374 at step S920 and performs the processing of steps S950 and S960 (FIG. 19) with respect to the network interface number "2". The device state controller 376 then sends the network interface state change completion notice to the state change controller 374 at step S980.

As the results of such processing, the second network interface 220b corresponding to the network interface number "2" is powered ON, and the network interface state 2785 of the second network interface 220b is changed to "power ON" in the device information table 378 as shown in FIG. 26.

When the device information table 378 has the contents of FIG. 26 and the network interface state change has been completed, the contents of the device information table 378 are changed to the contents shown in FIG. 27. The contents of the device information table 378 are changed from the contents of FIG. 26 to the contents of FIG. 27 by series of operations described below.

The state change controller 374 identifies the lastly changed network interface state as "power ON" at step S1010 (FIG. 20) and notifies the device state controller 376 of the list including the combinations of the network interface number and the port number having the same link aggregation number and their post-change port states, in order to change the port states of all the combinations of the network interface number "1" and the port number "1", the network interface number "1" and the port number "2", the network interface number "1" and the port number "3", the network interface number "2" and the port number "1", and the network interface number "2" and the port number "2" to "up" at steps S1020 to S1040 (FIG. 20).

The device state controller 376 identifies the post-change port state included in each of the notified port state change instruction data at step S620 (FIG. 17), repeats the processing of steps S680 to S700 (FIG. 17) with respect to the combinations of the network interface number "1" and the port number "1", the network interface number "1" and the port number "2", the network interface number "1" and the port number "3", the network interface number "2" and the port number "1", and the network interface number "2" and the port number "2", and subsequently performs the processing of steps S710 and S720 (FIG. 17). The state change controller 374 identifies the lastly changed port state as "up" at step S810 (FIG. 18) and terminates the port state change completion notice receiving-time process.

As the results of such processing, the port states of the ports 230a to 234a and the ports 230b to 232b are changed to "up", while there is no change in port state with respect to the ports 236a to 238a and the ports 234b to 238b.

B5. Advantageous Effects of Embodiment

In the network system 30 according to the second embodiment described above, when the link aggregation is set for at least two ports belonging to a plurality of different network interfaces, the third network device 300 can keep only the packet receiver port in the ON state, while setting the other ports belonging to the same link aggregation group as that of the packet receiver port to the OFF state. Like the second network device 200 of the first embodiment, the third network device 300 of the second embodiment can thus achieve the efficient power saving function.

The third network device 300 advantageously reduces the electric power potentially consumed by the packet receiving filters and the packet sending filters corresponding to the ports other than the packet receiver port, which belong to the same link aggregation group as that of the packet receiver port, among the packet receiving filters 250a to 258a and the packet receiving filters 250b to 258b and the packet sending filters 260a to 268a and the packet sending filters 260b to 268b of the forwarding engine 340. The third network device 300 can thus achieve the more efficient power saving function.

Additionally, the third network device 300 can power off the network interface where all the ports are in the power OFF state, thus ensuring the more efficient power saving function.

When receiving a WOL packet, the third network device 300 changes the port states of all the ports including the packet receiver port and belonging to the same link aggregation group as that of the packet receiver port, to the port state "up". Additionally, when there is any network interface in the power OFF state at the time of receiving a WOL packet and the network interface in the power OFF state includes the ports having the same link aggregation number as that of the packet receiver port that has received the WOL packet, the third network device 300 immediately powers on the network interface. These ensure restoration from the quiescent state within a short time period.

C. Modifications

Modification 1

The exemplary contents of the device information table 278 or 378 included in the network device are shown and explained in the above embodiments. The items included in the device information table 278 or 378 may be determined arbitrarily within the scope of the invention. For example, the device information table 278 or 378 may include other items, in addition to or in place of some of the items described in the embodiments. Similarly the list data may also include other items, in addition to or in place of some of the items described in the embodiments.

Modification 2

In the embodiments described above, the network device includes the state change controller 274 or 374 and the device state controller 276 or 376. Alternatively the network device may have only one controller having both the functions of the state change controller and the device state controller.

Modification 3

In the second embodiment, the third network device 300 includes the two network interfaces 120a and 120b. Alternatively the third network device may include three or more network interfaces. In the second embodiment, one link aggregation is set across the two network interfaces. Alternatively one link aggregation may be set across three or more network interfaces.

Modification 4

In the embodiments described above, the network devices are interconnected by wired connection. Alternatively the network devices may be interconnected by wireless connection. The network adopts the Ethernet standard and the TCP/IP protocol in the above embodiments, but the network may adopt another standard or another protocol.

Modification 5

In the embodiments described above, the forwarding module analyzes a packet received at the interface module, selectively determines a sender port for sending the received packet among a plurality of ports included in the interface module, and forwards the packet to the determined port. The packet forwarding destination is, however, not limited to one of the ports included in the interface module that has received the packet. In another configuration including a different interface module from the interface module that has received a packet, the forwarding module may selectively determine one of a plurality of ports included in the different interface module as the sender port and forward the received packet to the determined sender port.

Modification 6

Part of the functions implemented by the hardware configuration in the above embodiments may be implemented by the software configuration, whilst part of the functions implemented by the software configuration in the above embodiments may be implemented by the hardware configuration.

The foregoing has described the invention in detail with reference to the illustrative embodiments and modifications. Among the various elements of the above embodiments and modifications, the elements other than those disclosed in the independent claims are additional and supplementary elements and may be omitted according to the requirements. The invention is not limited to the above embodiments and modifications, but a multiplicity of other modifications and modifications may be made to the embodiments without departing from the scope of the invention. The invention is only specified by the disclosure of the claims and the spirit and scope of the invention.

What is claimed is:

1. A network device for relaying a packet, comprising:
an interface module provided to include a plurality of ports for connecting with a line and configured to send and receive a packet via the line, wherein the plurality of ports are controllable to be individually powered on and off, and a link aggregation is set for at least two ports among the plurality of ports;
a forwarding module configured to analyze the packet received by the interface module, determine a forwarding destination to which the packet is to be forwarded, and forward the packet to the determined forwarding destination; and
a port state controller configured to control a power on-off state of each of the plurality of ports, wherein the port state controller comprises:
a first determination module configured, when a sleep notification packet for making the network device in a quiescent state is received at a packet receiver port among the plurality of ports included in the interface module, to determine whether the link aggregation is set for the packet receiver port; and
a first changeover module configured, when the first determination module determines that the link aggregation is set for the packet receiver port, to keep the packet receiver port in a power ON state, while changing all ports other than the packet receiver port which belong to an identical link aggregation group with the packet receiver port among the plurality of ports, to a power OFF state,
wherein the forwarding module comprises:
a number of receiving filters provided respectively corresponding to the plurality of ports and controllable to be individually powered on and off, wherein the receiving filters and the ports are the same in number; and
a number of sending filters provided respectively corresponding to the plurality of ports and controllable to be individually powered on and off, wherein the sending filters and the ports are the same in number, and
a filter state controller configured, when the first determination module determines that the link aggregation is set for the packet receiver port, to keep one of the receiving filters corresponding to the packet receiver port in the power ON state and change one of the sending filters corresponding to the packet receiver port to the power ON state, while changing all other of the receiving filters and all other of the sending filters respectively corresponding to all the ports subjected to the change to the power OFF state by the first changeover module, to the power OFF state.

2. The network device according to claim 1, wherein the port state controller comprises:
a second determination module configured, when a WOL packet for restoring the network device from the quiescent state is received at a packet receiver port, among the plurality of ports included in the interface module, to determine whether the link aggregation is set for the packet receiver port; and
a second changeover module configured, when the second determination module determines that the link aggregation is set for the packet receiver port, to change all ports including the packet receiver port and belonging to an identical link aggregation group with the packet receiver port, to the power ON state.

3. The network device according to claim 1,
wherein the network device comprises a plurality of the interface modules, and
wherein the identical link aggregation group is set for at least two ports belonging to a number of different interface modules.

4. The network device according to claim 3,
wherein the plurality of interface modules are controllable to be individually powered on and off,
wherein the network device further comprises:
a third determination module configured to determine whether there is any interface module where all ports are in the power OFF state, among the plurality of interface modules, after operation by the first changeover module; and
a third changeover module configured, when the third determination module determines presence of any interface module where all the ports are in the power OFF state, to change the determined interface module to the power OFF state.

5. A control method of a network device for relaying a packet,
the network device comprising:
an interface module provided to include a plurality of ports for connecting with a line and configured to send and receive a packet via the line, wherein the plurality of ports are controllable to be individually powered on and off, and a link aggregation is set for at least two ports among the plurality of ports; and
a forwarding module configured to analyze the packet received by the interface module, determine a forwarding destination to which the packet is to be forwarded, and forward the packet to the determined forwarding destination,
the control method comprising:
when a sleep notification packet for making the network device in a quiescent state is received at a packet receiver port among the plurality of ports included in the interface module, determining whether the link aggregation is set for the packet receiver port; and
when the determination is made that the link aggregation is set for the packet receiver port, keeping the packet receiver port in a power ON state, while changing all ports other than the packet receiver port which belong to an identical link aggregation group with the packet receiver port among the plurality of ports, to a power OFF state,
when a WOL packet for restoring the network device from the quiescent state is received at a packet receiver port, among the plurality of ports included in the interface module, determining whether the link aggregation is set for the packet receiver port; and
when the determination is made that the link aggregation is set for the packet receiver port, changing all of the ports including the packet receiver port and belonging to an identical link aggregation group with the packet receiver port to the power ON state.

6. A computer program product for controlling a network device for relaying a packet,
the network device comprising:
an interface module provided to include a plurality of ports for connecting with a line and configured to send and receive a packet via the line, wherein the plurality of ports are controllable to be individually powered on and off, and a link aggregation is set for at least two ports among the plurality of ports; and a forwarding module configured to analyze the packet received by the interface module, determine a forwarding destination to which the packet is to be forwarded, and forward the packet to the determined forwarding destination, the computer program product comprising:

a first program code for, when a sleep notification packet for making the network device in a quiescent state is received at a packet receiver port among the plurality of ports included in the interface module, determining whether the link aggregation is set for the packet receiver port;

a second program code for, when the determination is made that the link aggregation is set for the packet receiver port, keeping the packet receiver port in a power ON state, while changing all ports other than the packet receiver port which belong to an identical link aggregation group with the packet receiver port among the plurality of ports, to a power OFF state; and a non-transitory computer readable medium that stores the first and second program codes, a third program code for, when a WOL packet for restoring the network device from the quiescent state is received at a packet receiver port among the plurality of ports included in the interface module, determining whether the link aggregation is set for the packet receiver port; and a fourth program code for, when the determination is made that the link aggregation is set for the packet receiver port, changing all of the ports including the packet receiver port and belonging to an identical link aggregation group with the packet receiver port to the power ON state.

* * * * *